(12) United States Patent
Pagano et al.

(10) Patent No.: US 10,732,042 B2
(45) Date of Patent: Aug. 4, 2020

(54) GEOSTATIONARY EARTH ORBIT (GEO) EARTH MULTISPECTRAL MAPPER (GEMM)

(71) Applicant: California Institute of Technology, Pasadena, CA (US)

(72) Inventors: Thomas S. Pagano, Thousand Oaks, CA (US); Joseph Sauvageau, Pasadena, CA (US); Kim A. Aaron, Pasadena, CA (US); Curt A. Henry, Pasadena, CA (US); Dean L. Johnson, Pasadena, CA (US); James P. McGuire, Pasadena, CA (US); Fabien Nicaise, Pasadena, CA (US); Nasrat A. Raouf, Pasadena, CA (US); Suresh Seshadri, Cerritos, CA (US); James K. Wolfenbarger, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/783,633

(22) Filed: Oct. 13, 2017

(65) Prior Publication Data

US 2018/0106673 A1 Apr. 19, 2018

Related U.S. Application Data

(60) Provisional application No. 62/407,706, filed on Oct. 13, 2016.

(51) Int. Cl.
*G01J 3/02* (2006.01)
*G01J 3/28* (2006.01)
*G01J 3/36* (2006.01)

(52) U.S. Cl.
CPC ........... *G01J 3/2823* (2013.01); *G01J 3/0208* (2013.01); *G01J 3/0229* (2013.01); *G01J 3/0264* (2013.01);

(Continued)

(58) Field of Classification Search
CPC ...... G01J 3/2823; G01J 3/0208; G01J 3/0229; G01J 3/0264; G01J 3/0286; G01J 3/2803;

(Continued)

(56) References Cited

U.S. PATENT DOCUMENTS

| 6,678,048 B1 * | 1/2004 | Rienstra | G01J 3/2803 356/419 |
| 2010/0245818 A1 * | 9/2010 | Viard | G01J 3/02 356/326 |

(Continued)

OTHER PUBLICATIONS

Malin, M. C., et al. "Mars Color Imager (MARCI) on the Mars Climate Orbiter." Journal of Geophysical Research: Planets 106.E8 (2001): 17651-17672 (Year: 2001).*

(Continued)

*Primary Examiner* — Dominic J Bologna
(74) *Attorney, Agent, or Firm* — Gates & Cooper LLP

(57) ABSTRACT

A multi-spectral imager useful for weather mapping, comprising an array of filters on at least one focal plane array (FPA) including pixels. Each of the filters are associated with a different set of the pixels, and each of the filters transmit a portion of electromagnetic radiation, comprising a different band of wavelengths, to the set of the pixels associated with the filter. A circuit connected to the pixels reads out a signal outputted from each of a plurality of different pixels in the set and outputs the signals to an adder. The adder sums the signals from each of the plurality of different pixels in the set to form a sum used for generating a weather map.

20 Claims, 22 Drawing Sheets

(52) U.S. Cl.
CPC .......... *G01J 3/0286* (2013.01); *G01J 3/2803* (2013.01); *G01J 3/36* (2013.01); *G01J 2003/2806* (2013.01); *G01J 2003/2813* (2013.01); *G01J 2003/2826* (2013.01)

(58) Field of Classification Search
CPC .............. G01J 3/36; G01J 2003/2806; G01J 2003/2816; G01J 2003/2826
See application file for complete search history.

(56) References Cited

U.S. PATENT DOCUMENTS

| | | | | |
|---|---|---|---|---|
| 2011/0176577 A1* | 7/2011 | Bandara | ................. | G01J 3/36 374/121 |
| 2016/0187535 A1* | 6/2016 | Maschhoff | ............. | G01W 1/10 250/338.5 |

OTHER PUBLICATIONS

Observing Systems Capability Analysis and Review Tool (OSCAR), www.wmosatinfo/oscar/instruments/view/3. Downloaded from the Internet Mar. 4, 2019.

Li, J., T. Schmit, X. Jin, G. Martin, .GOES-R Advanced Baseline Imager (ABI) Algorithm Theoretical Basis Document for Legacy Atmospheric Moisture Profile, Legacy Atmospheric Temperature Profile, Total Precipitable Water, and Derived Atmospheric Stability Indices. http://www.goesr.gov/products/ATBDs/baseline/Sounding_LAP_v2.0_no_color.pdf, Sep. 2010, 106 pages.

Pagano, T.S., Aumann, H., Gerber, A., Kuai, L, Gontijo, I., DeLeon, B., Susskind, J., Iredell, L., Bajpai, S., "Requirements for a Moderate-resolution Infrared Imaging Sounder (MIRIS)", Proc. SPIE 8870-7, San Diego, CA (2013), 9 pages.

R. Demers et al., The CHROMA focal plane array: a large-format, low-noise detector optimized for imaging spectroscopy, Proc SPIE, vol. 8870, (2013) DOI: 10.1117/12.2029617, 7 pages.

Cardinali, C, "Monitoring the observation impact on the short-range forecast", Q. J. R. Meteorol. Soc. 135, pp. 239-250 (2009).

http://www.vision-syslems.com/articles/print/volume-20/issue-7/departments/technology-trends/filters-and-optics-multispectral-filters-let-cameravendors-target-niche-markets.html. Downloaded from the internet Mar. 4, 2019.ring the observation impact on the short-range forecast, Q. J. R. Meteorol. Soc. 135, pages 239-250 (2009).

http://www.northropgrumman.com/Capabilities/HighEfficiencyCryocoolers/Documents/pageDocs/HighEfficiencyCryocoolerPerformanceICC18.pdf, 8 pages, Downloaded from the internet Mar. 4, 2019.

Canadian Space Agency, Polar Communication and Weather (PCW) Mission Requirements Document, CSA-PCWRD-003, Revision C, Jun. 11, 2013, NCAGE Code: L0889, 12 pages, https://earth.esa.int/workshops/spaceandthearctic09/kroupnik.pdf, Downloaded from the internet on Mar. 4, 2019.

\* cited by examiner

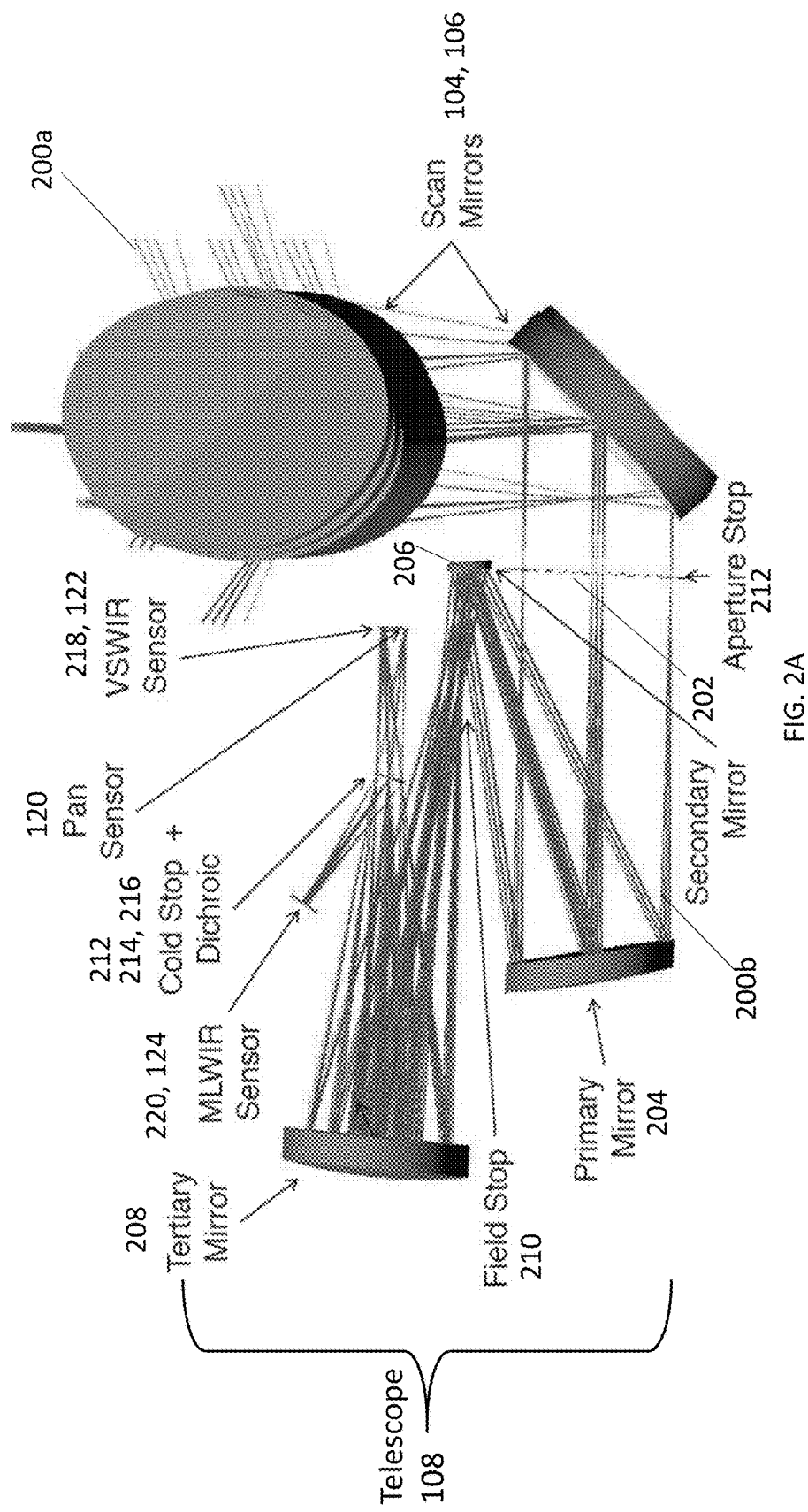

GEOSTATIONARY EARTH ORBIT (GEO) EARTH MULTISPECTRAL MAPPER (GEMM)

CROSS REFERENCE TO RELATED APPLICATIONS

This application claims the benefit under 35 U.S.C. Section 119(e) of commonly-assigned U.S. Provisional Patent Application Ser. No. 62/407,706, filed on Oct. 13, 2016, by Kim M. Aaron, Curt A. Henry, James P. McGuire, Dean L. Johnson, Thomas S. Pagano, Suresh Seshadri, Nasrat A. Raouf, Joseph Sauvageau, James K. Wolfenbarger and Fabien Nicaise, entitled "GEOSTATIONARY EARTH ORBIT (GEO) EARTH MULTISPECTRAL MAPPER (GEMM)", (CIT-7612-P2); which application is incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates to a multispectral mapper and methods of fabricating and using the multispectral mapper.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

Earth imaging from Geosynchronous Earth Orbit (GEO) is a fundamental element of a complete operational weather forecasting system. The imagery from these satellites is available in near real time and allows forecasters to monitor and predict severe weather events at the regional and global scale. Data products include cloud properties (fraction, height and type), wind, dust and aerosol amounts (e.g. sandstorms), volcanic ash, land and sea surface temperatures and profiles of atmospheric temperature and humidity.

The next generation of Meteorological GEO Imaging satellites will include contributions by Europe (EUMETSAT), the United States (NOAA), Korea (KMA), China (CMA) and Japan (JMA). While overlap exists in the fields of view for many of these satellites, degraded performance occurs at the edges of the field.

The challenge for meteorological forecasting agencies is the cost and development risk of these systems, since they require very large and complex instruments and dedicated spacecraft. The combined scale and complexity of the current systems has led to significant cost overruns and schedule delays leading decision makers and Program Managers to look for alternative solutions. The present invention satisfies this need.

SUMMARY OF THE INVENTION

The present disclosure reports on a multi-spectral imager useful for weather mapping. The imager comprises an array of filters on at least one focal plane array (FPA) including pixels. Each of the filters are associated with a different set of the pixels, and each of the filters transmit a portion of electromagnetic radiation, comprising a different band of wavelengths, to the set of the pixels associated with the filter. A circuit connected to the pixels reads out a signal outputted from each of a plurality of different pixels in the set and outputs the signals to an adder, computer, or processor. The adder, computer, or processor sums the signals from each of the plurality of different pixels in the set to form a sum used for generating a weather map.

In one or more embodiments, the electromagnetic radiation is collected from different spatial positions in a field of view, the pixels are arranged in columns (e.g., at least 1600 columns) and rows (e.g., at least 480 rows), each of filters (e.g., at least 10) overlay the set of pixels in each of the columns, each of the filters cover a different plurality of the rows, the electromagnetic radiation is scanned across each of the filters along each of the columns in turn (column by column), each column of pixels receives the portion of electromagnetic radiation transmitted from a different one of the spatial positions in the field of view, and the adder sums the signals for each of the sets in each column, forming the spectral band sums used for detecting the spectral information associated to the weather condition at each of the spatial positions in the field of view.

In one or more examples, each filter comprises a stripe having a width overlaying the set of at least 10 pixels. Example pixel widths include, but are not limited to, a width of 30 micrometers.

In one or more embodiments, a plurality of the FPAs are provided and each of the filters on the first FPA transmit a different portion of long wavelengths in a range of 3-14 micrometers, and each of the filters on the second FPA transmit a different portion of short wavelengths in a range of 0.4 to 2 micrometers.

In one or more embodiments, mirrors raster scan the field of view inputted onto the imager over a region of the Earth's atmosphere, and the adder forms the spectral band sums used for detecting the weather condition at each of the spatial positions in each of the fields of view. In one or more embodiments, the raster scanning comprises push broom scanning with the FPAs in a whisk orientation, and such that the region having an area of 13000 km by 13000 km or less is scanned in 15 minutes or less.

In yet another example, a sounder is coupled to the imager on the satellite.

In yet a further example, the imager is a GEO Earth Multispectral Mapper (GEMM) for observation of critical near real time weather parameters from a Highly Elliptical Orbit (HEO) or GEO orbit including 21 spectral bands ranging in wavelength from 0.45-14.4 µm. Signal-to-Noise (SNR), Noise Equivalent Differential Temperature (NEdT) and dynamic range were analyzed and demonstrate that the mapper offers comparable or better performance to the current planned NOAA and EUMETSAT GEO Imagers.

Moreover, in one or more embodiments, the instrument is lightweight, compact and well suited to hosting on a standard communications satellite.

BRIEF DESCRIPTION OF THE DRAWINGS

Referring now to the drawings in which like reference numbers represent corresponding parts throughout:

FIGS. 2A-2B illustrates GEMM embodiment employing a pair of scan mirrors, Three Mirror Anastigmat (TMA) with a beamsplitter (and corrector) and two FPA's.

FIGS. 3A-3C illustrate a filter array on a FPA, according to one or more embodiments, wherein FIG. 3C illustrates GEMM stripe filter array for MLWIR band has 13 filters.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

GEMM Instrument Example

Figure 1A:
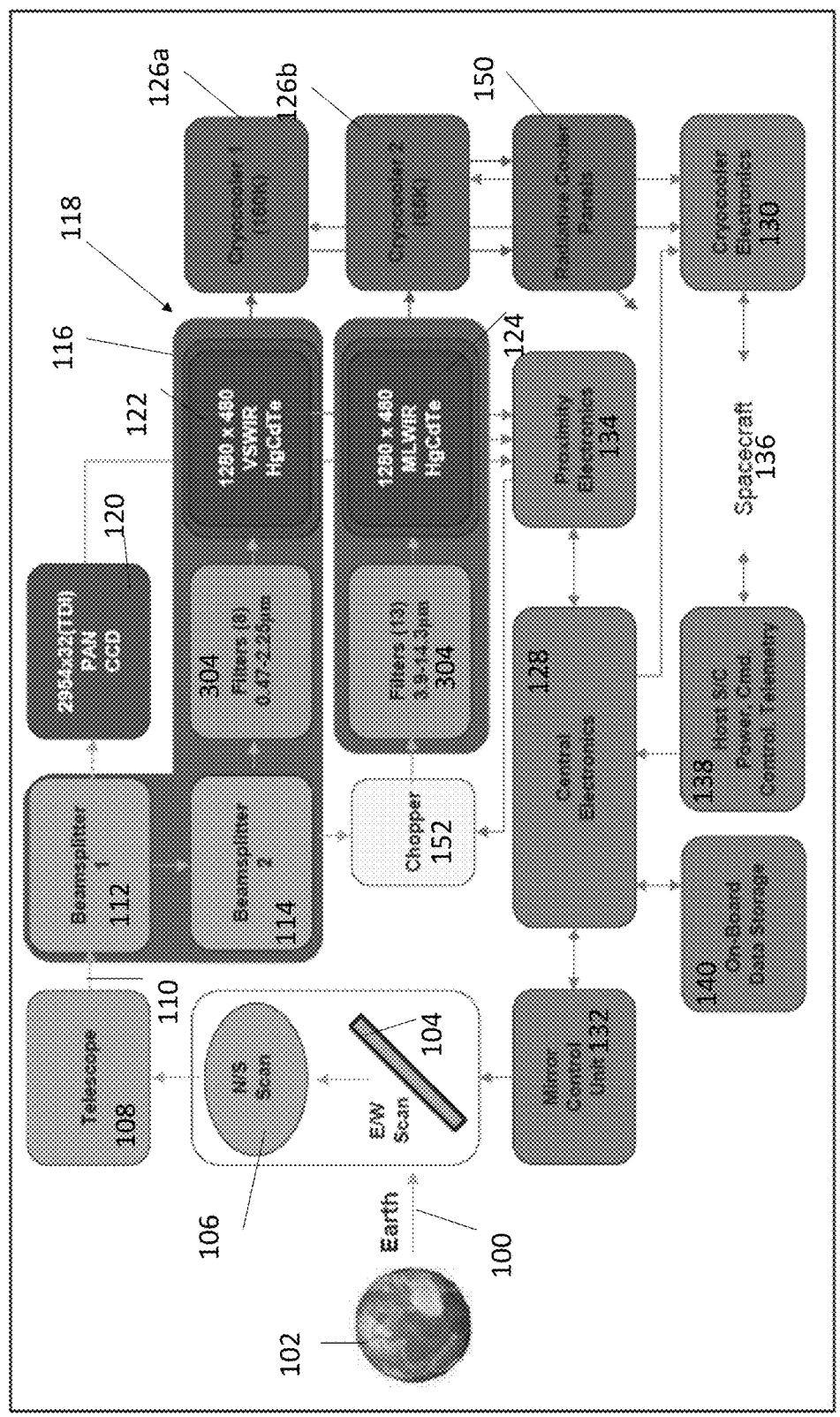
FIG. 1A illustrates GEMM Block diagram, according to one or more embodiments. Items in orange are optics, green are filters, red are focal plane assemblies, purple are thermal subsystems, and blue are electronics subsystems.

FIG. 1A is a block diagram of a GEO Earth Multispectral Mapper (GEMINI). Energy 100 from the Earth 102 is collected East-West (E/W) and North-South (N/S) directions using a pair of orthogonal scanning mirrors 104, 106 and directed to a Three Mirror Anastigmat telescope (TMA telescope) 108. The telescope energy 110 is further split into a Panchromatic Band (PAN), Visible-to-Shortwave Infrared (VSWIR) band and a Mid-to-Long Wavelength Infrared (MLWIR) band using two dichroic beamsplitters 112, 114 in the converging beam 116. At the focal point 118 of the telescope 108 are 3 Focal Plane Assemblies (FPAs) 120, 122, 124, one for each spectral band (one 120 for the PAN band, one 122 for the VSWIR bands, and one 124 for the MLWIR bands). In the examples characterized herein, a silicon time delay integration (TDI) Charged Couple Device (CCD) is used for the PAN band FPA 120 and HgCdTe area detector arrays are used for the VSWIR band and MLWIR band FPAs 122, 124. Cooling is also provided. In the examples characterized herein, two active Pulse Tube Cryocoolers 126a, 126b provide cooling to 160 K (for the VSWIR detectors) and 65 K (for the MLWIR detectors). The 160 K cryocooler 126a also cools the optics 112, 114 to 160 K to minimize radiant thermal loading on the detector 122 and cold stage of the cryocooler 126b. Central electronics 128 interface with (1) the cryocoolers 126a, 126b through cryocooler electronics 130, (2) scanners 104, 106 using motor control unit 132, (3) detectors 120, 122, 124 through proximity electronics 134 (providing on-board signal processing), (4) regulate power from the spacecraft 136 through host electronics 138, and (5) provide communications with the ground segment through host electronics 138. On board data storage 140 is also provided. Also illustrated are radiative cooler panels 150 and chopper 152.

Figure 1B:
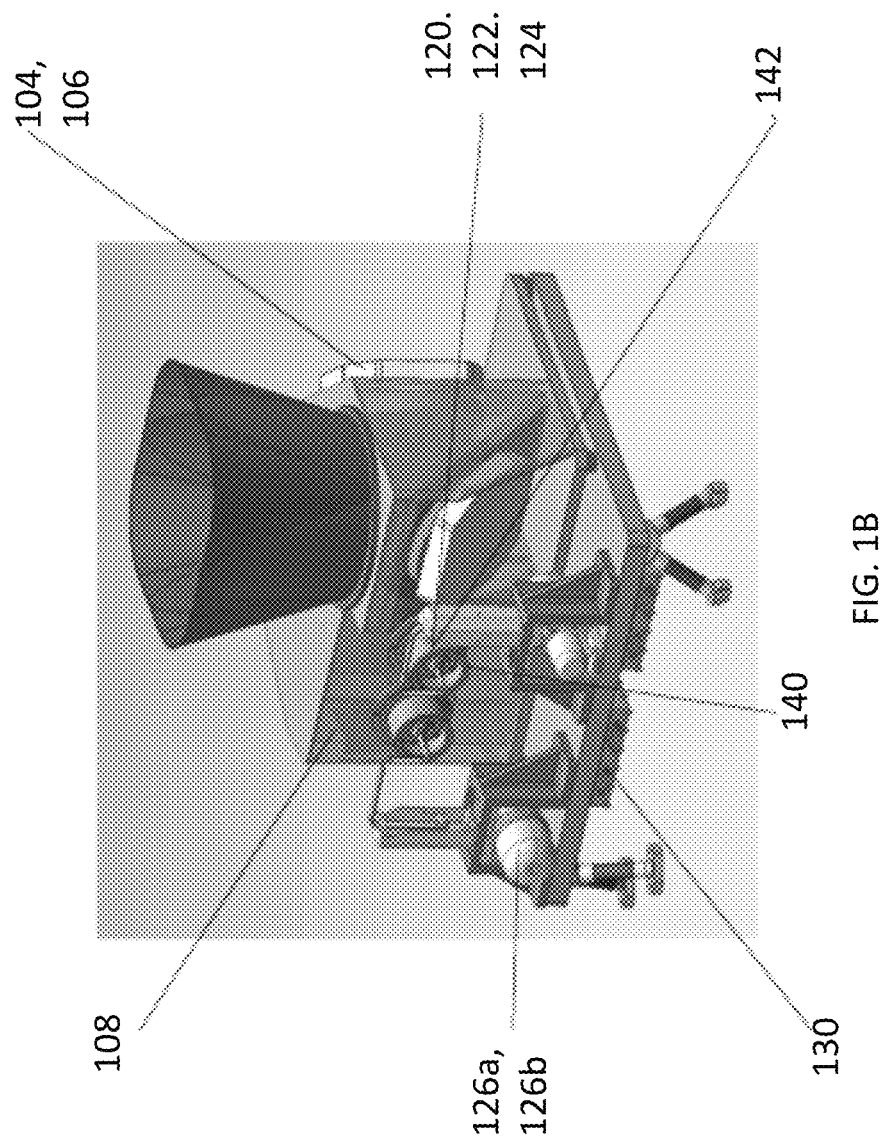
FIG. 1B illustrates the imager mounted on a satellite, according to one or more embodiments.

FIG. 1B illustrates the instrument comprising the scanning mirrors 104, 106, FPAs 120, 122, 124, FPA thermal shells 140, cryocooler electronics 130, cryocoolers 126a, 126b, butcher block filter sets 142, and TMA telescope 108.

Figure 2B:
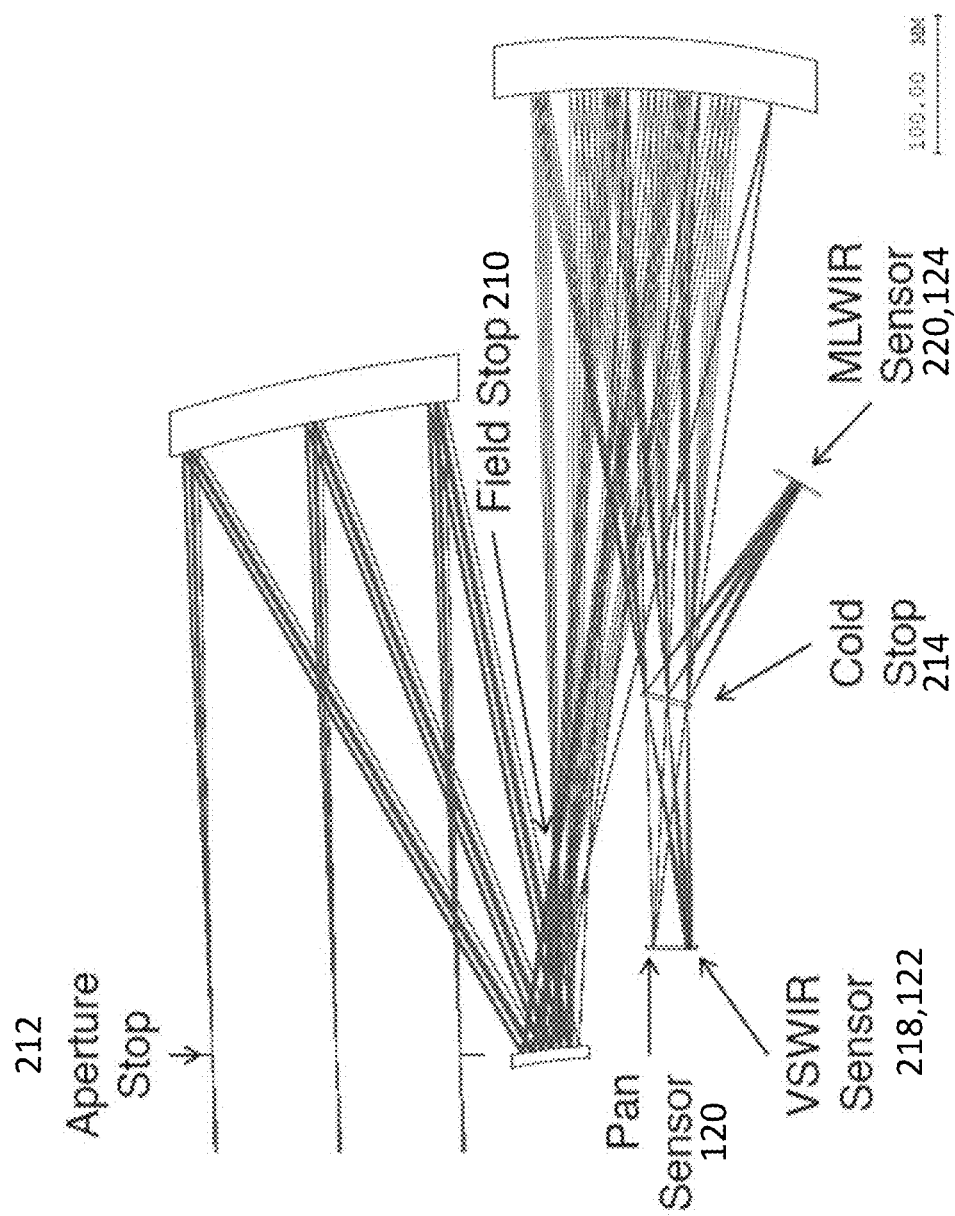

FIG. 2A-2B show a ray trace through the GEMM optics according to one example. Table 1 summarizes example optics specifications and performance. Light 200a enters through a pair of scan mirrors 104, 106 controlled by actuators that provide 2-D scanning without image rotation. Light 200b proceeds to an aperture 202 (e.g., having a diameter of 200 mm) and into the telescope 108. The telescope 108 comprises three co-axial conic mirrors 204, 206, 208 which together form a Three-Mirror Anastigmat (TMA). Light 200b reflects off the primary 204, reflects off the secondary 206, and forms an intermediate image, where a field stop 210 is located. The tertiary mirror 208 forms an image of the aperture stop 212, where a Lyot stop 214 is located. This image of the aperture stop 212 is the exit pupil and the location of the compensated dichroic beam splitter 216. The beam splitter 216 transmits light short of 3 microns to a visible and near infrared focal plane 218, 122 and reflects wavelengths longer than 3 microns through to the MWIR and LWIR focal plane 220, 124.

The TMA telescope 108 design form provides several advantages. First, the real entrance pupil is useful for line-of-sight scanning, packaging, and calibration. The real pupil minimizes the size of the scan mirrors 104, 106, which leads to a smaller, lighter, and lower cost system. Also, if needed, a small calibrator can be placed in the entrance pupil to provide uniform radiometric calibration. The second advantage is that the combination of the field stop 210 and the Lyot stop 214 eliminates all first order stray light. The third advantage is that all the structure between the focal plane and the exit pupil can be kept cold, to minimize the impact of thermal emission on the signal-to-noise. The detectors 218, 122, 220, 124 will only see the cold structure and the mirrors.

In one example, the telescope 108 comprises a precision machined aluminum structure with post-polished diamond turned aluminum mirrors with integral mounting features. These alignment features allow the telescope 108 to be directly bolted-together, without expensive and time consuming alignment. GEMM only needs to be diffraction limited for 10 micrometers wavelength.

Filters

Figure 3A:
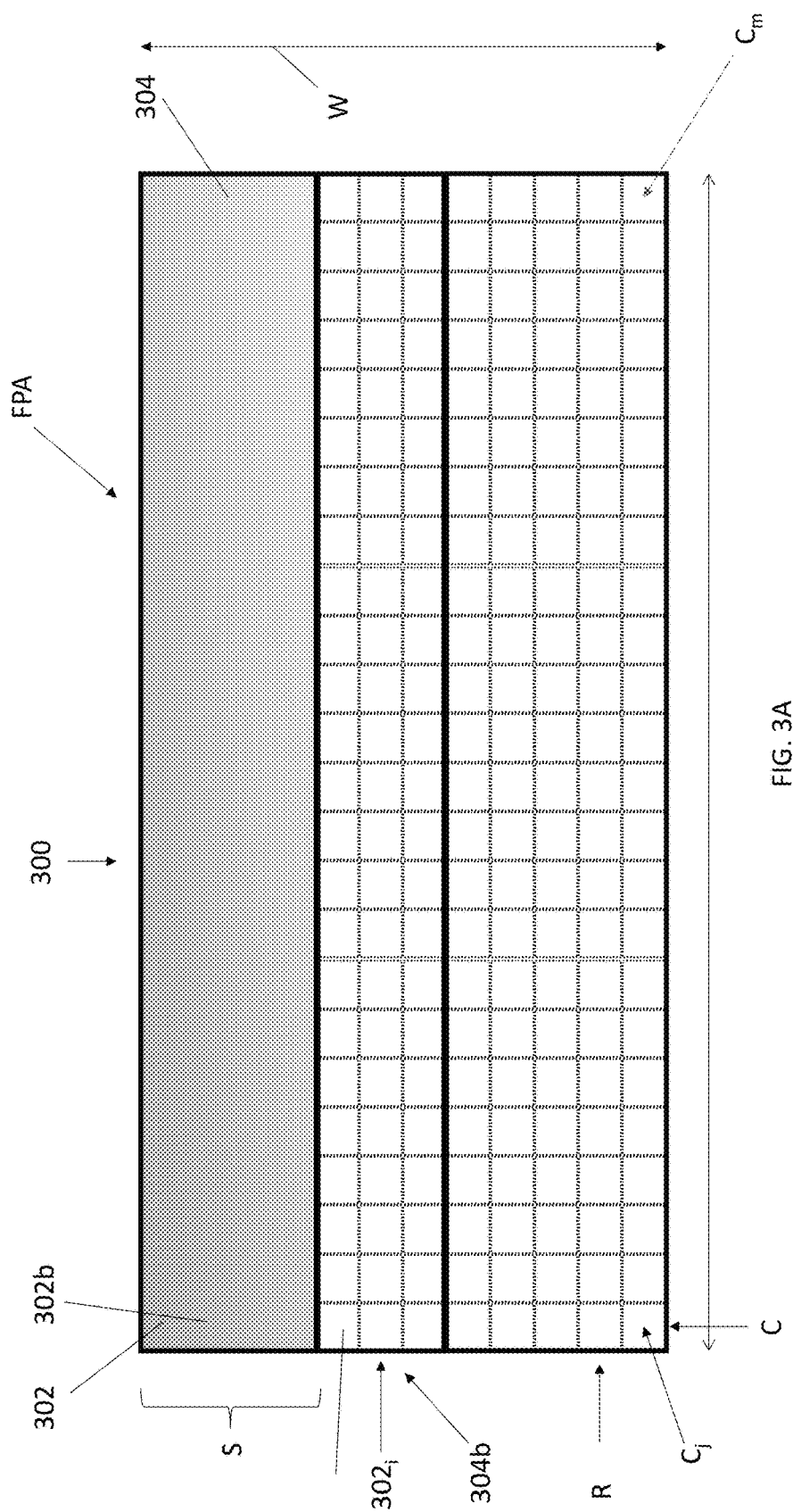
Figure 3B:
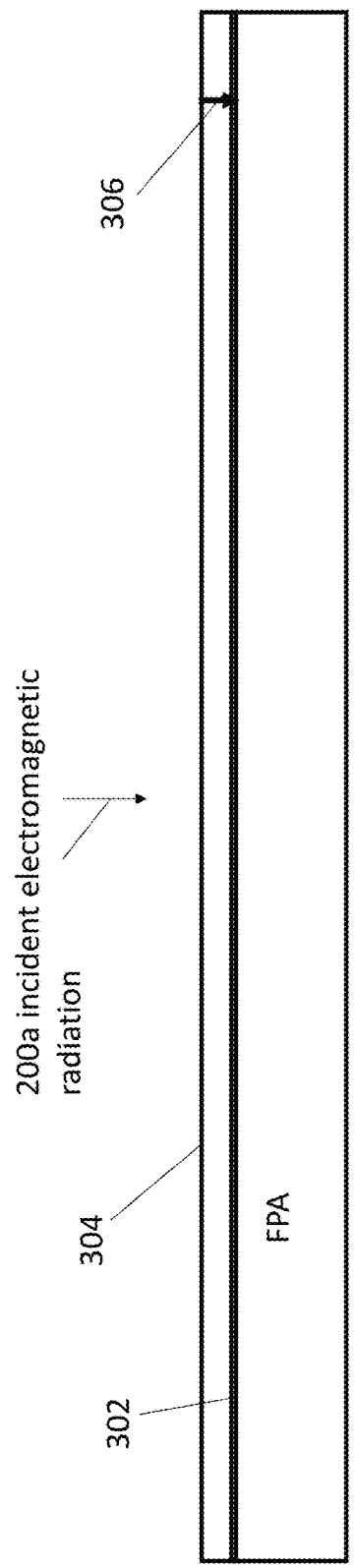

FIGS. 3A-3B illustrates an FPA (e.g., 120, 218, 122, 220, 124) including pixels 302 arranged in columns C and rows R, wherein each of the FPAs has an array of stripe interference filters 304. Each of the filters 304 are associated with a different set S of the pixels 302, and each of the filters 304 transmit a portion of electromagnetic radiation 200a, comprising a different band of wavelengths, to the set of the pixels 302 associated with the filter 304. For example, FIG. 3A shows each of filters 304 overlaying the set S of pixels 302 in each of the columns C but each covering a different plurality of the rows R.

In one or more examples, the FPA has at least 1600 or at least 2000 columns, at least 480 or at least 2000 rows, and at least 10 filters are on each FPA.

In FIG. 3A, the filters 304 comprise stripes extending the length of the FPA detector array. The filter stripes 304 in the GEMM instrument characterized herein are 616 micrometers wide and overlay 18 active rows of pixels and some non-used pixels. However, other configurations are possible. Other examples include, but are not limited to, each filter comprising a stripe having a width overlaying the set of at least 10 pixels or overlaying a number of pixels in a range of 5-50 pixels. Examples of pixel width include, but are not limited to, pixel widths of at least 30 micrometers, less than 30 micrometers, or widths in a range of 5-1000 micrometers.

Figure 3C:
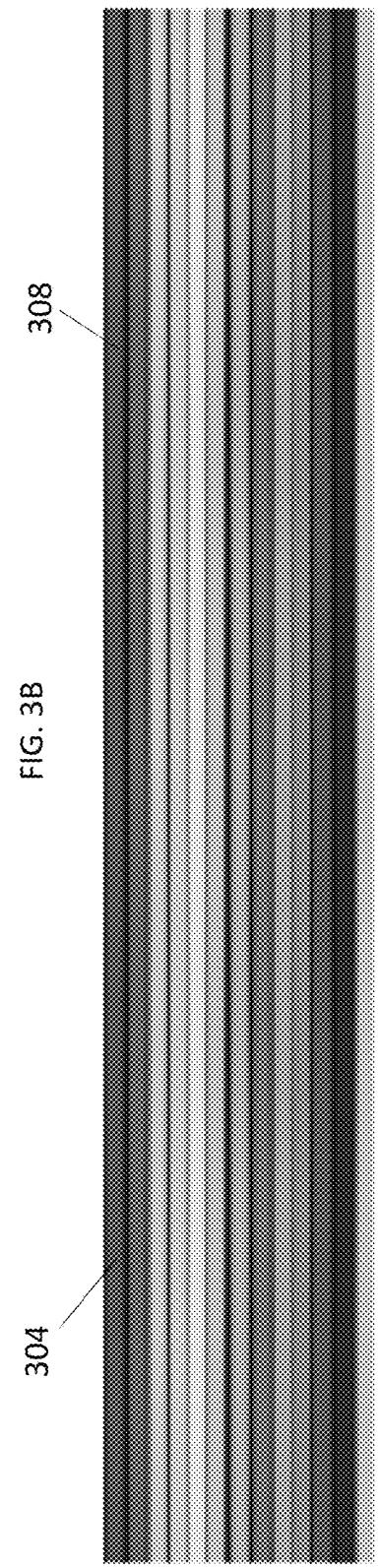

FIG. 3B is a side view illustrating how each of the filters 304 transmit a portion 306 of the electromagnetic radiation 200a incident on each filter 304 to the pixels on the FPA. FIG. 3C is a top view of the filters 304 each transmitting a portion 306 of electromagnetic radiation 200a comprising a different band of wavelengths 308.

Figure 4A:
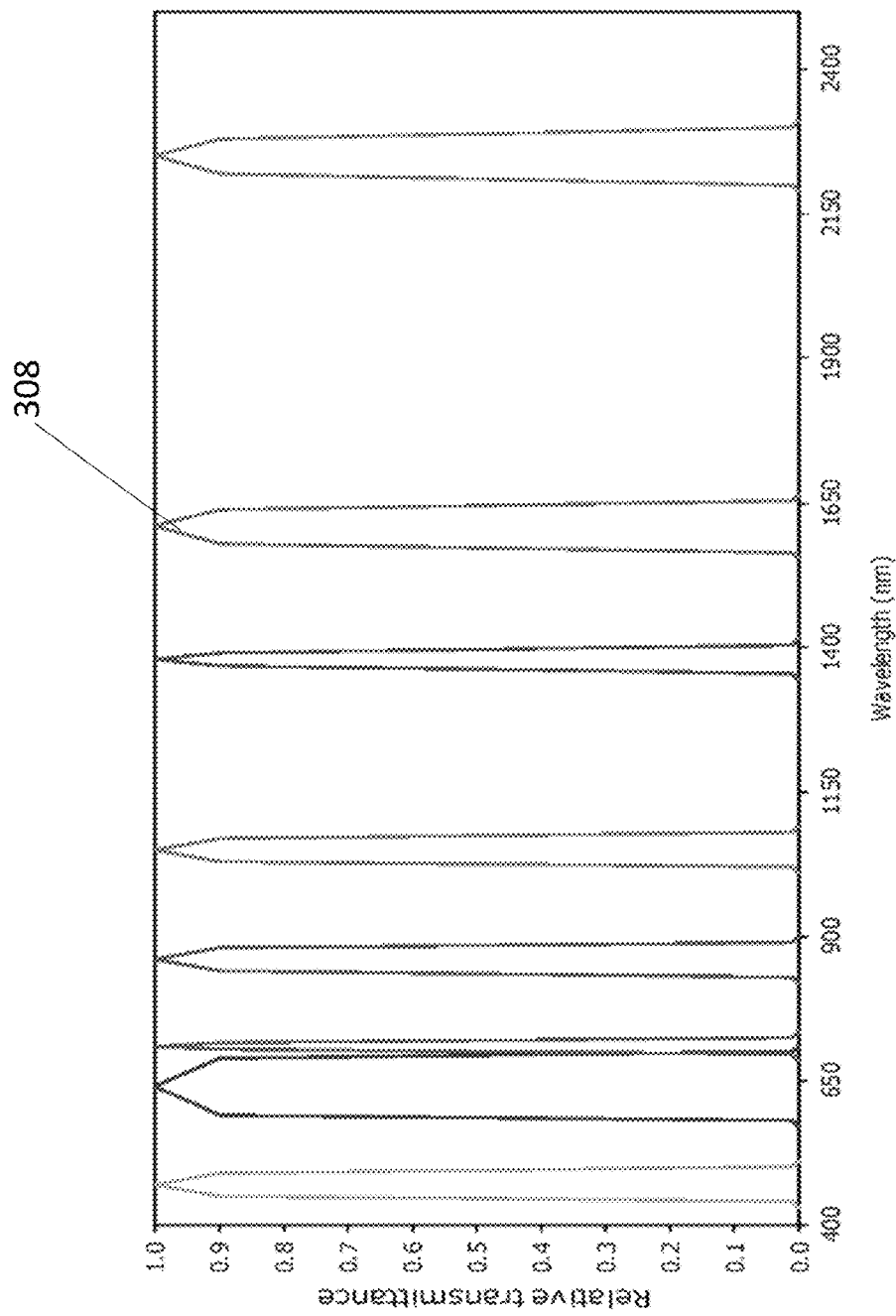
FIGS. 4A-4C illustrate the transmission of the filter arrays and dichroic mirrors, according to one or more embodiments.
Figure 4B:
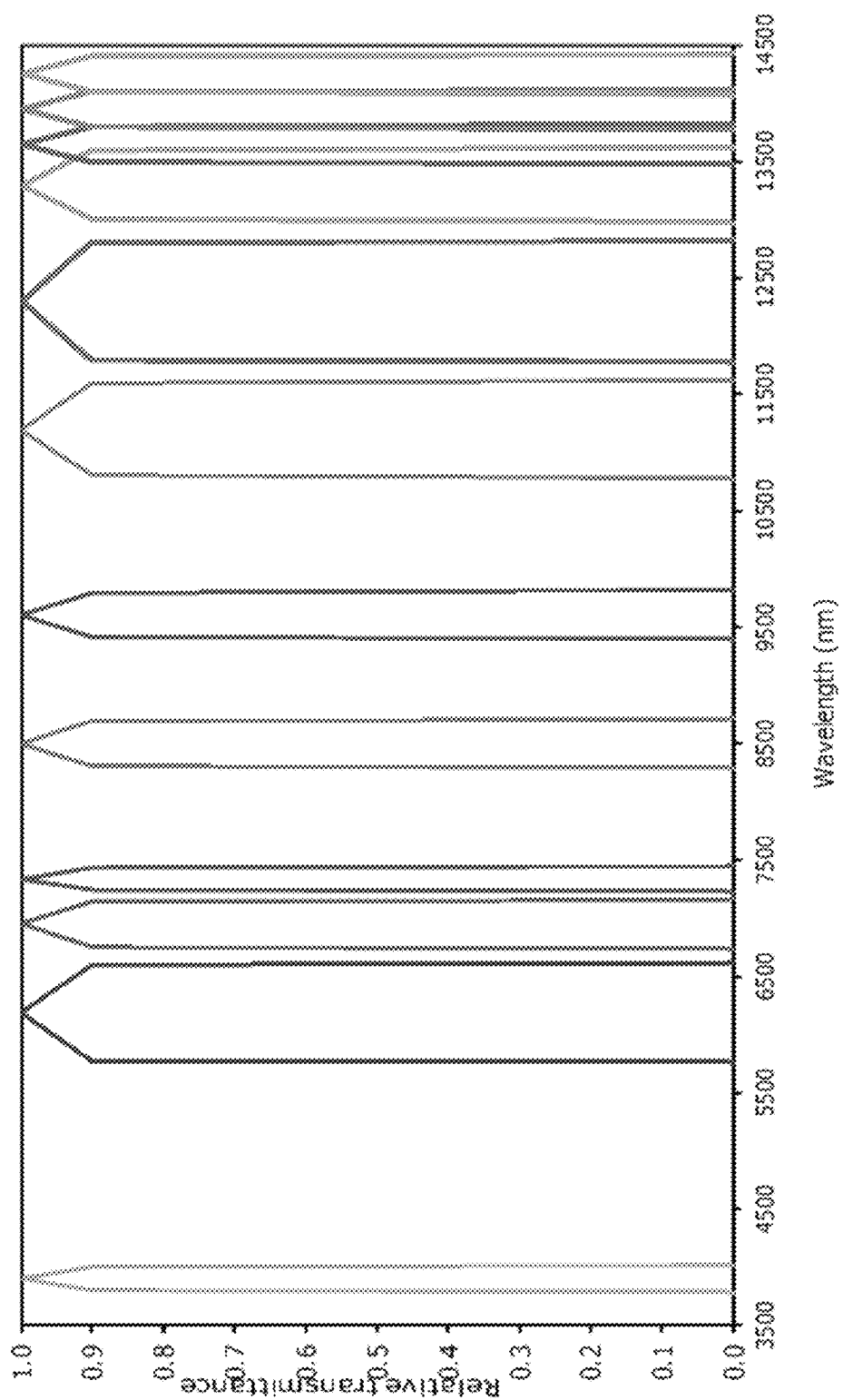
Figure 4C:
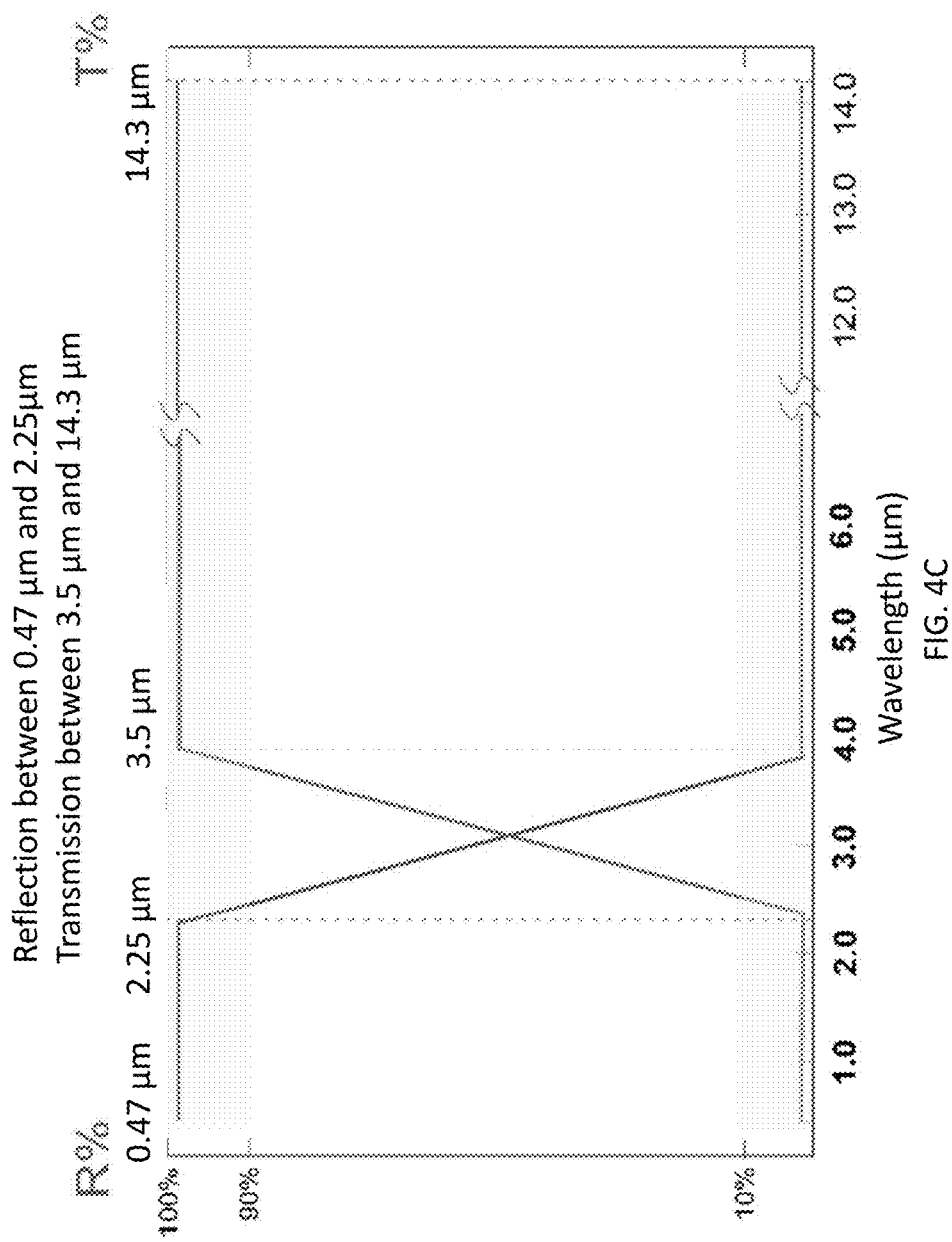
Figure 4D:
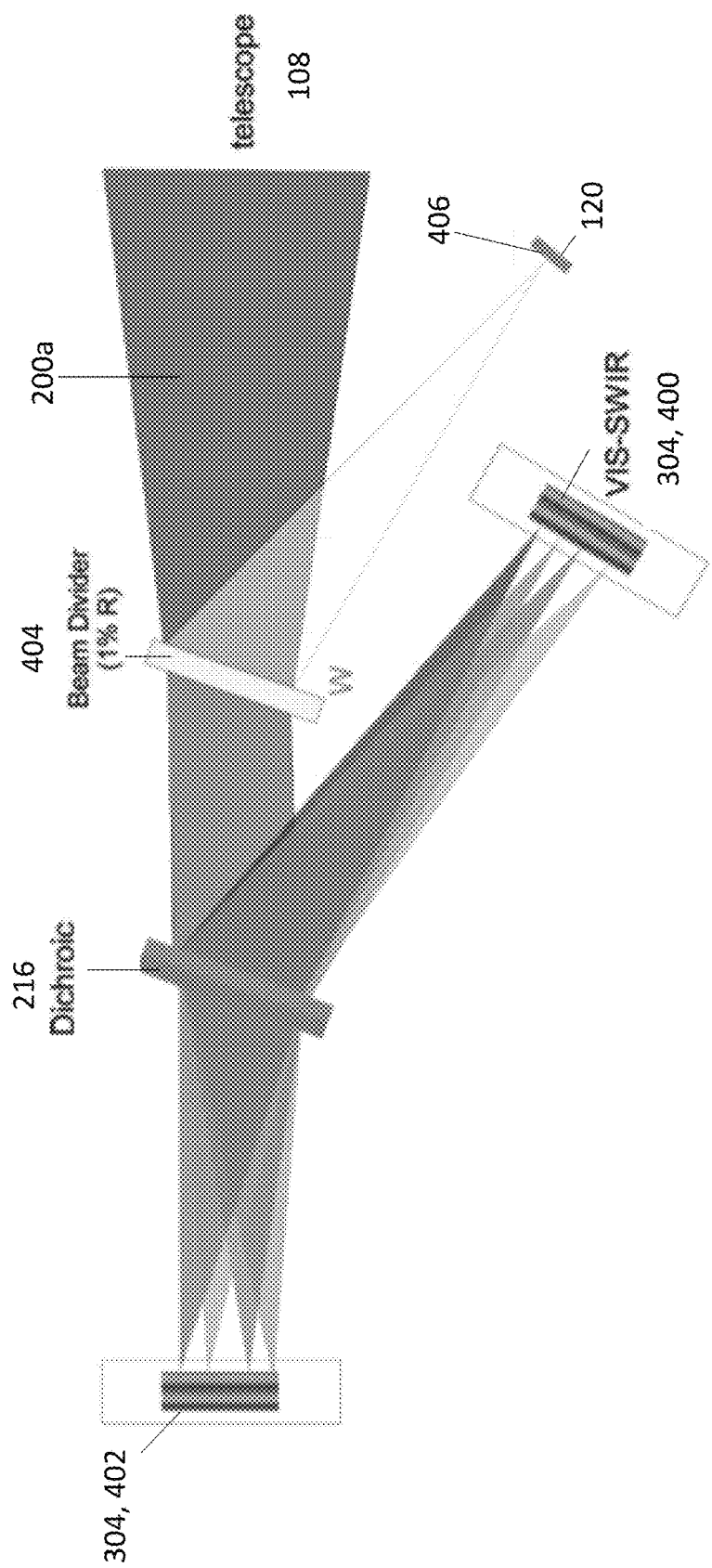
FIG. 4D illustrates the filter arrays on FPAs in the optical system, according to one or more embodiments.

FIGS. 4A-4B illustrates transmission bands for each of the interference filters 304. FIG. 4C illustrates the transmission of the beamsplitter comprising a dichroic mirror 216. FIG. 4D shows how the dichroic mirror 216 distributes the electromagnetic radiation 200a comprising a different band of wavelengths 308 across each of the filters 304, 400, 402. Co-registration accuracy between bands is achieved using a 2-mirror scan approach, a monolithic FPA and beam splitters to coregister the PAN, VSWIR and MLWIR. The filters 400 on the VSWIR FPA transmit wavelengths in a range of 0.47 micrometers to 2.25 micrometers in 8 bands. The filters 402 on the MWIR FPA transmit wavelengths in a range of 3.9 micrometers to 14.3 micrometers in 13 bands. The dichroic mirror reflects wavelengths in a range of 0.47 micrometers to 2.25 micrometers and transmits wavelengths in a range of 3.9 micrometers to 14.3 micrometers. Also shown is a beam divider 404 reflecting 1% of the electromagnetic radiation to the 640 nm wavelength sensitive PAN camera 120 having 640 nm filter 406.

In one or more examples, filters (comprising one or more dielectric materials) are deposited onto substrates (e.g., a thin glass substrates) comprising a single filter. Multiple filters are bonded together to make a "butcher block" of filters that is then placed in close proximity to the FPA. In one or more examples, a bezel is used to hold the butcher block in place.

TABLE 1

Example summary optics specifications and performance for GEMM.

| Parameter | Specification | Performance |
|---|---|---|
| Configuration | Imager, dichroic beam splitter, pair of focal planes with striped filters | |
| Spectral bands | | |
| a. Short band (μm) | a. 8 covering 0.45-2.28 | |
| b. Long band (μm) | b. 13 covering 3.8-14.4 | |
| Aperture (mm, diameter) | | 200 |
| Detector | | |
| Format | 1600 × 480 | |
| Pixel size (μm) | 30 × 30 | |
| Number of arrays | 2 | |
| F-number | 6 | |
| 6. Instantaneous Field of view (°, +/−) | | |
| a. Along track | 1.28 | |
| b. Cross track | 0.214 | |
| Scan mirror range (°, +/−, optical) | 20 | |
| MTF (worst Rad/Tan, lens only, @5.5 cy/mm, as-built) | >0.54 | 0.99 (nominal 0.45 μm) 0.54 (nominal 12 μm) |
| RMS spot size (mm, worst field) | | 0.003 (VNIR/SWIR) 0.006 (MWIR/LWIR) |
| RMS distortion (mm, at best magnification, along 18 pixel integration) | | 0.0014 (long band) |
| Telecentricity (°) | | 9.8-15.1 |
| Maximum aspheric sag (mm, from best fit sphere) | | 0.731, 0.072, 0.058, 0.00095 |
| Package size (mm, imaging optics only) | | 212 × 393 × 344 |

Example FPA Technologies

In the example characterized herein, a Teledyne CHROMA™ scientific grade readout and Teledyne "thinned" HgCdTe detector material are used for the VSWIR FPA, and a longwave cutoff HgCdTe detector is the material for the MLWIR FPA[5]. Pixel sizes for the CHROMA™ are 30 μm×30 μm arranged in the largest format configuration available (480×1600 detector pixels). The CHROMA readout provides a wide dynamic range (9000:1) and can operate at rates up to 125 Hz.

The MLWIR material has a cutoff at around 13 μm, but still provides some response at the longest band in the GEMM. In order to use the device without saturation, the infrared device was oversampled (e.g., by a factor of 3) and then the pixels were co-added on-board. Detector cooling is required to 200 K for the VSWIR FPA, and 55 K for the MLWIR FPA. The cold band is driven by the long-wave cutoff material. Cooling of the aft-optics in the MLWIR band to 160 K is required to minimize background loading on the detectors.

In the example characterized herein, the Panchromatic Band uses an E2V AT71548 TDI array consisting of 5200 along track pixels×32 pixels in TDI. The array contains more pixels than required (the design uses 2954 pixels along track). Dark current and read noise for this device are significantly lower than required for weather forecasting applications.

Example Electronics

Figure 5A:
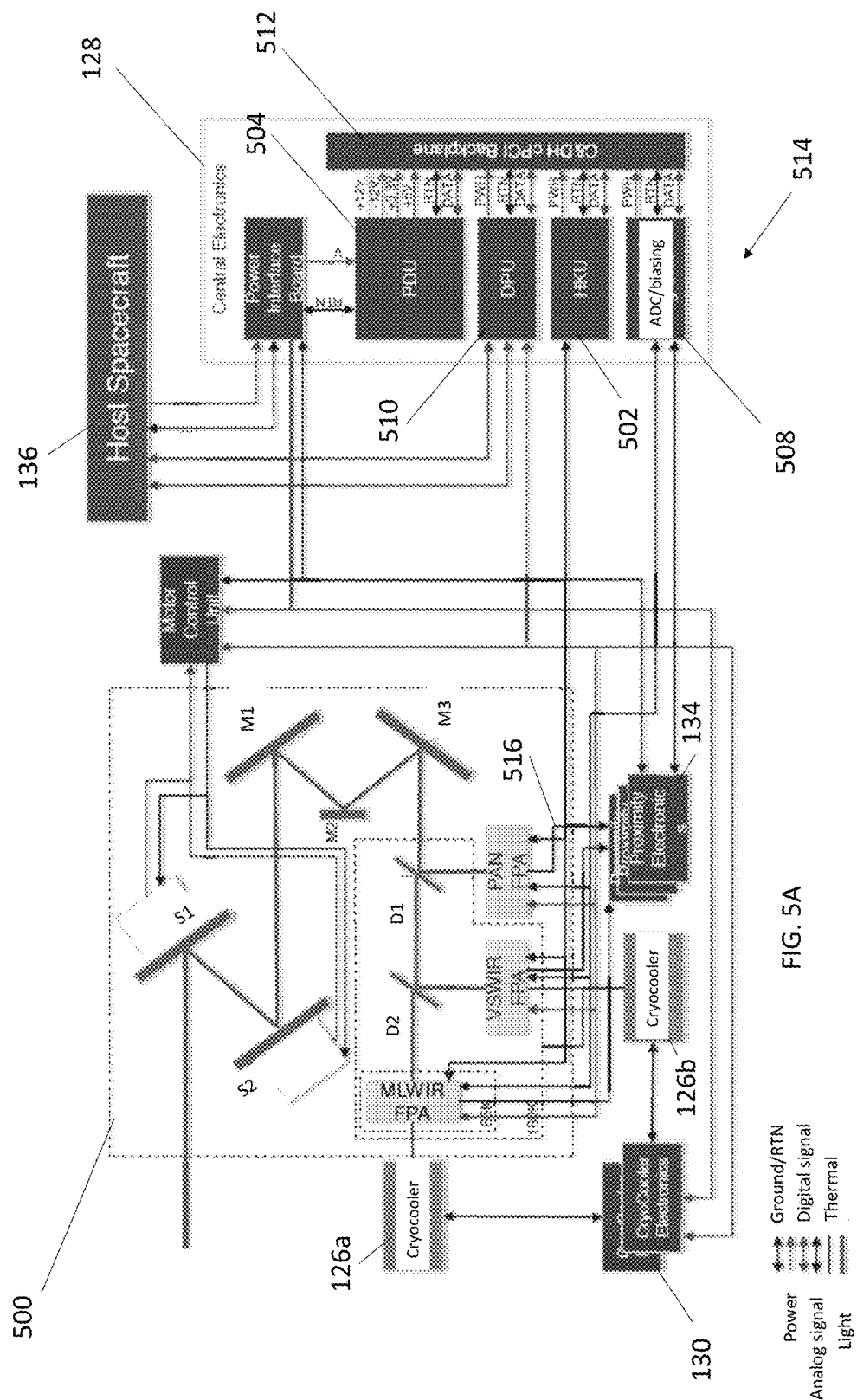
FIGS. 5A-5B illustrates the imager coupled to electronics used to control the imager and process data for the imager (e.g., performing summing), according to one or more embodiments.

FIG. 5A illustrates the imager 500 including FPAs, primary M1 (204 in FIG. 2A), secondary M2 (206 in FIG. 2A), tertiary mirror M3 (208 in FIG. 2A), scanning mirrors S1 and S2 (104, 106 respectively in FIG. 2A), and beamsplitters D1, D2 (216 in FIG. 2A). The imager 500 is coupled to electronics comprising the central electronics 128, cryocooler electronics 130, mirror control unit 132, proximity electronics 134, housekeeping unit (HKU) 502, power distribution unit (PDU) 504, power interface board 506, analog to digital converter (ADC) 508, digital processing unit 510, and backplane 512 (for peripheral component interconnect PCI and Command and Data Handling (C&DH).

Also shown is the electronic circuit 514 for controlling the imager 500 and reading and processing the signals 516 produced by the pixels 302 in response to detecting the electromagnetic radiation 308 (referring also to FIG. 3A-3C). The electronic circuit 514 comprises proximity electronics 134, analog to digital converter 508, and digital processing unit 510 (DPU).

Figure 5B:
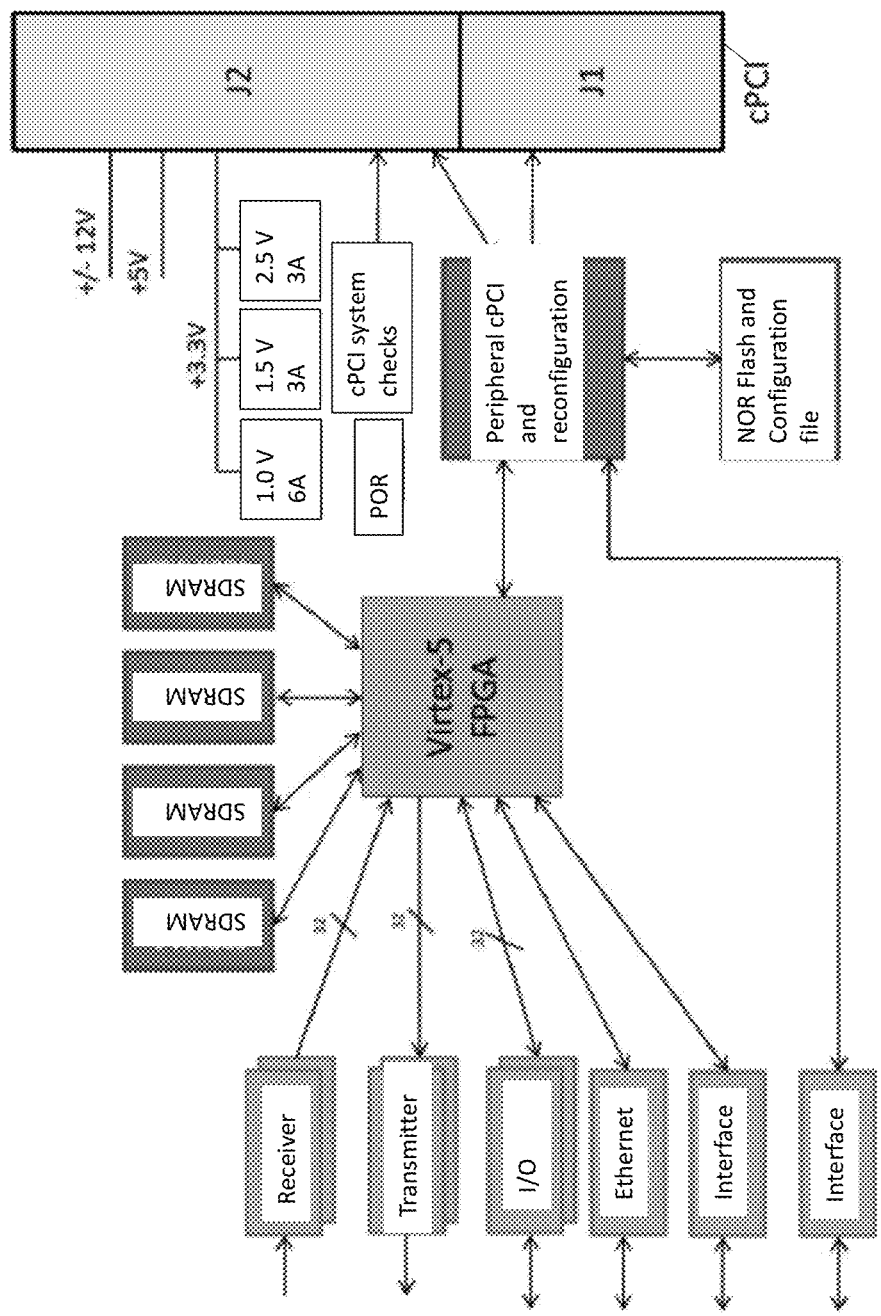

FIG. 5B is a schematic of the DPU 510.

Thermal Cooling Example

Mechanical cryocoolers have proven to be a very robust, reliable means of providing cooling in flight instruments. In example imager characterized herein, high efficiency coolers (HEC) are used.

Two single-stage high efficiency coolers (HEC) provide cooling to the two focal planes and the optical bench. The first cooler provides cooling to the 55-K long wave detector. The second cooler cools the optical bench to 160 K and also provides the 200-K cooling for the short wave detector. The coolers are located in close proximity to the devices being cooled, with flexible thermal straps drawing the heat from the FPAs and the OBA to the cooler coldtips. The single-stage HEC cooler is capable of providing in excess of 3 watts of refrigeration at 50 K, or well in excess of 20 watts of refrigeration at 150 K, at the cooler coldtip, easily handling the total cooling requirements for either of these temperature zones. The heat generated by the cryocoolers is transferred to a 293-K heat rejection radiator via variable conductance heat pipes.

Figure 6:
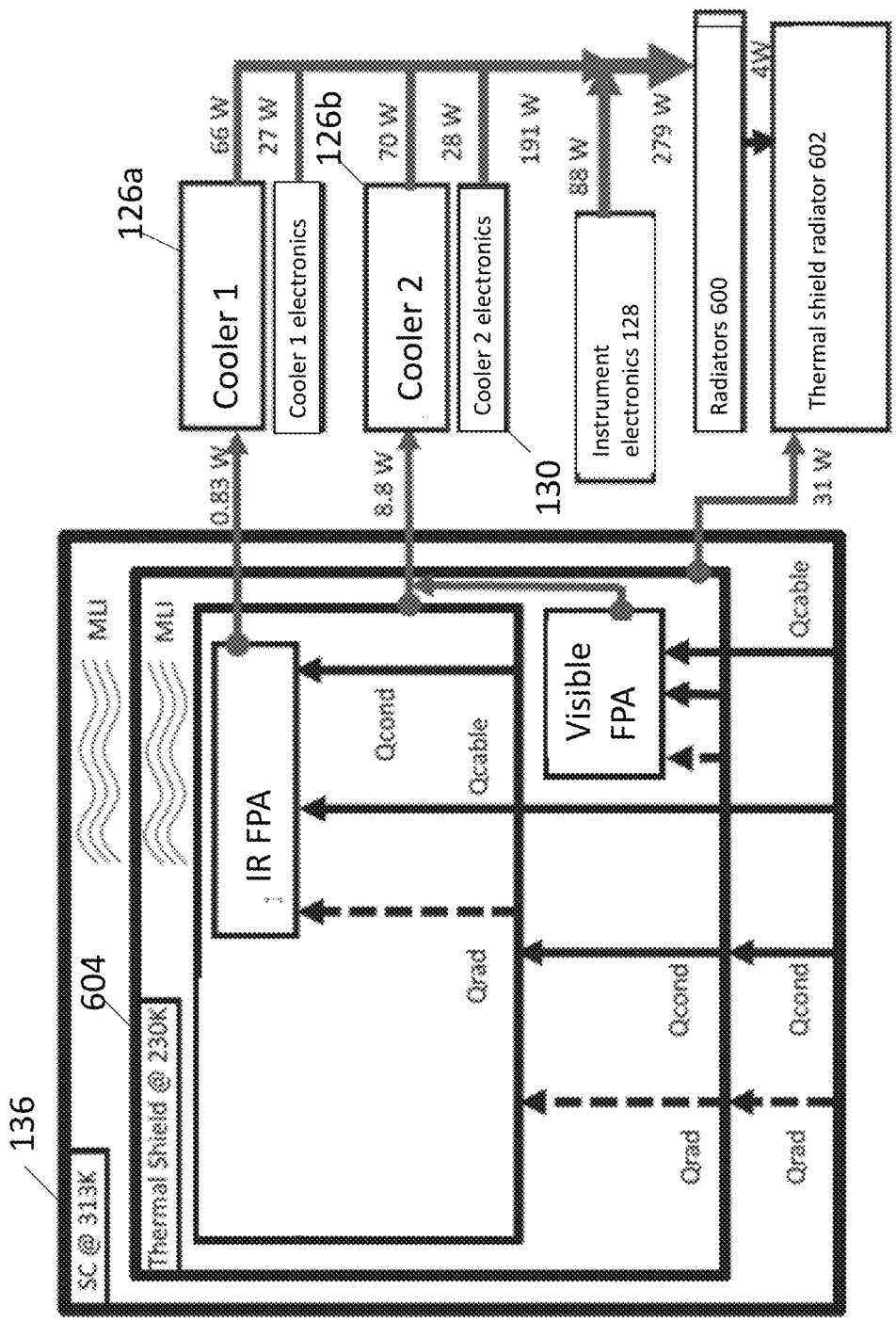
FIG. 6 illustrates a GEMM Thermal Schematic, according to one or more embodiments.
Figure 7:
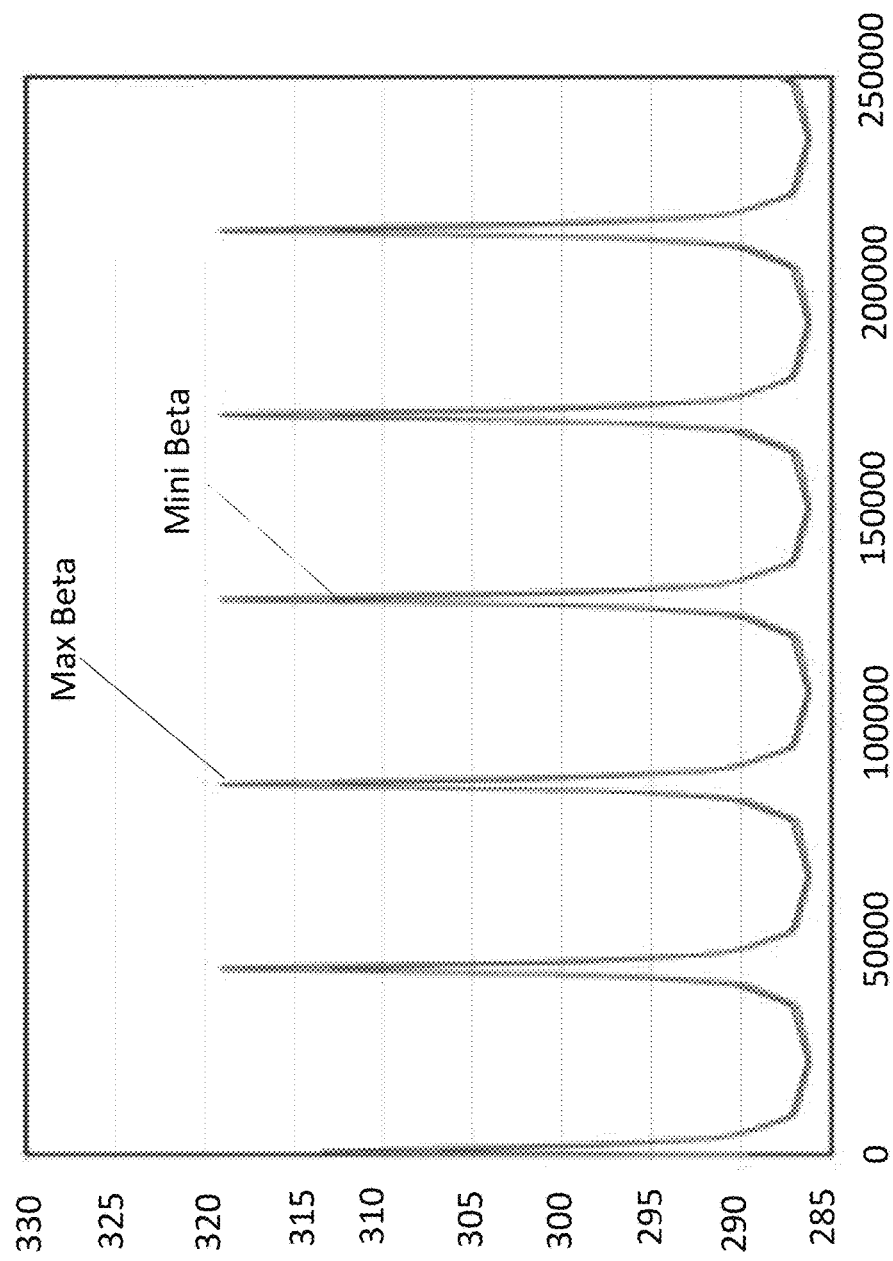
FIG. 7 illustrates Nadir Panel Radiator Temperature remains cool for majority of orbit, according to one or more embodiments.

A thermal schematic showing the different thermal zones and approximate thermal loads for GEMM is shown in FIG. 6. A 210-K 0.75 $m^2$ nadir-pointing radiator 602 cools the overall instrument thermal shield to 230 K to help intercept radiative Qrad and conductive Qcond parasitic heat to the optical bench. An additional nadir-pointing 293-K heat rejection radiator (2.1 m2) 600 can be used to reject the heat produced by the cryocooler 126a, 126b and the instrument electronics 128. The radiator assumptions include the use of white paint for an emissivity (ε) of 0.85 and an absorptivity (α) of 0.25. FIG. 7 shows that the radiator temperature remains near room ambient temperature for much of the 12-hour orbit in the highly idealized case of having no solar flux loading on the nadir radiator. Placement of the instrument and its radiators on the host has bearing on the effectiveness and size of the Nadir radiators. Solar shades are used to minimize the solar flux loading on the radiators.

Assumptions that went in to the initial thermal analyses include a 12-hour Molniya orbit, fixed at a 63.4 degree inclination to the equator, and having a 600-km perigee and a 39500-km apogee. Other thermal parameters include: the Solar flux=1354 W/$m^2$, the earth Albedo=0.35, and an average earth temperature of 250 K. A 50% margin has been placed on these preliminary loads to the cryocoolers to provide conservatism in the power requirements for the coolers. Similarly, the 210-K thermal shield radiator has been sized to include a 50% margin for the 230-K thermal shield load and to include thermal loading from the HRS radiator.

Scanning Procedure

Figure 8:
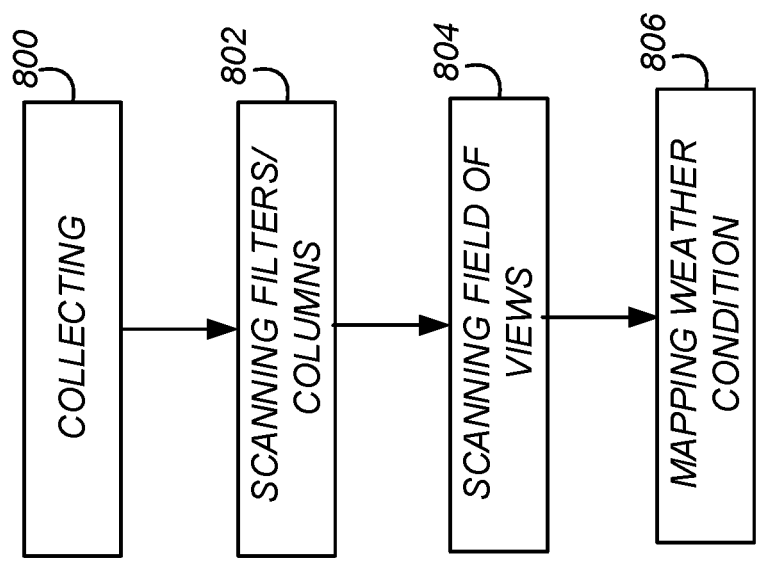
FIG. 8 is a flowchart illustrating a scanning procedure, according to one or more embodiments.

FIG. 8 is a flowchart illustrating a method of detecting a weather condition.

The method comprises the following steps.

Figure 9:
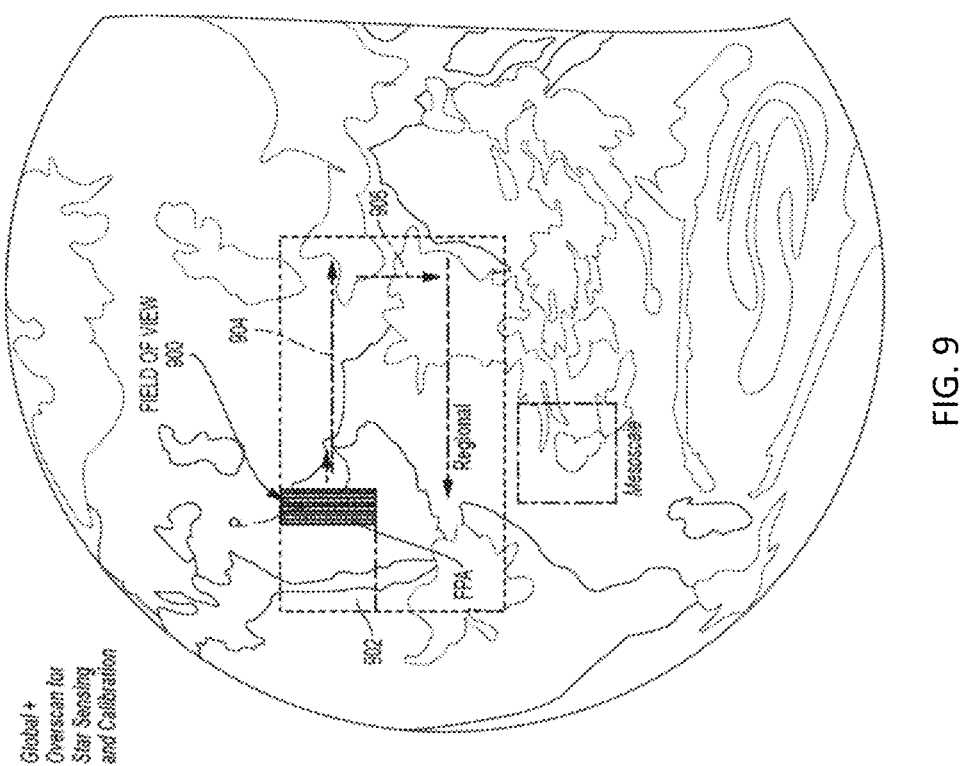
FIG. 9 is a diagram illustrating a method of scanning the Earth, according to one or more embodiments.

Block 800 represents collecting electromagnetic radiation 200a on an imager 500, e.g., from different spatial positions P in a field of view 900 (referring to FIG. 9). The electromagnetic radiation 200a comprises different bands of wavelengths 308.

Block 802 represents scanning the electromagnetic radiation 200a across each of the filters 304 (e.g., butcher block filter) in turn. The scanning comprises:
1. each of the filters 304 transmitting a portion 306 of the electromagnetic radiation 200a, comprising a different one of the bands of wavelengths 308, to the set S of the pixels 302 associated with the filter 304; and
2. for each of the sets S:
   (i) irradiating each of a plurality of different pixels 302 in the set S with the portion 306 of electromagnetic radiation 200a comprising the band of wavelengths transmitted by the filter 304 associated with the set S;
   (ii) reading out a signal 516 outputted from each of the plurality of different pixels 302 in the set S, in response to the irradiating; and
   (iii) summing the signals 516 from each of the plurality of different pixels in the set, forming a sum (e.g., spectral band sum) used for detecting a weather condition.

In one or more examples, the scanning scans the electromagnetic radiation 200a across each of the filters 304 and along each of the columns C in turn (column by column) and each column C of pixels 302 receives the portion 306 of electromagnetic radiation transmitted from a different one of the spatial positions in the field of view. The steps 2(i)-(iii) are performed for each of the sets S in each column C, forming the sums (e.g., spectral band sums) used for detecting the weather condition at each of the spatial positions in the field of view.

For example, a scan progresses as follows:
A. A point on the ground (on earth) is imaged on one pixel 302 and the image on the pixel 302 is read-out.
B. The scan mirror 104 then moves so the point on the ground is imaged on the next pixel 302b in the column C and the image on the next pixel 302b is read-out.
C. The scanning, imaging, and read out procedure of step B continues until the point on the ground has been imaged in all pixels 302 in the set S (e.g., a total of 18 pixels) across the filter stripe 304.
D. The read outs from all the pixels 302 across the stripe 304 are summed to improve the signal to noise. In one or more examples, the summing uses a quasi time delayed integration mode wherein the pixels 302 are summed in software after the frames have been read-out.
E. The point on the ground is next imaged in the first pixel 302i in the next filter band 304b using the process of steps A-D continues until images on each of the pixels 302i (indexed 1≤i≤n, where n is an integer representing the number of pixels under each filter) across the next filter band 304 are recorded and summed. In one or more example, n is in the range 3-20, and the total number of pixels in each column is at least 480.

F. Step E is repeated until images on each of the pixels 302*i* across each of the filter bands 304 are recorded and summed.

G. Steps A-F are repeated for each column $C_j$ (indexed $1 \le j \le m$, where m is an integer representing the number of columns covered by the filters, e.g., at least 1600). In this way, the sums obtained may be used for detecting the weather condition at each of the spatial positions in the field of view.

A circuit 514 connected to the pixels reads out the signal 514 outputted from each of a plurality of different pixels 302 in the set S and outputs the signals to an adder, computer, or processor (e.g., in the DPU), wherein the signals from each of the plurality of different pixels in the set S are summed to form the sum used for detecting/mapping a weather condition. Nonfunctioning or poorly performing detectors are removed from the summation.

Block 804 represents scanning the field of view. In one or more examples, the scanning comprises raster scanning the field of view inputted onto the imager over a region of the Earth's atmosphere and performing steps 2(i)-2(iii) or steps 1-7 for each of the fields of view.

FIG. 9 illustrates raster scanning the field of view 900 inputted onto the imager 500 over a region 902 of the Earth's atmosphere using mirrors 104, 106; and performing the steps of Blocks 800-802 for each field of view 900. In one or more examples, the raster scanning (e.g., using mirrors 104, 106 controlled using computer 1002) comprises push broom scanning with the FPAs in a whisk orientation, such that the region having an area of 13000 km by 13000 km or less is scanned in 15 minutes or less. The scanning comprises scanning the filter covered FPA along the length 904 of the region being scanned, shifting 906 the filter covered FPA sideways, and then scanning along the length 904 again. The shifting 906 and scanning along the length 904 are repeated until the entire region 902 is covered. In this way, the FPA detector creates a wide field of view together with a slow scan, achieving a higher signal to noise ratio (SNR) with a smaller telescope aperture.

In one or more examples, the imager includes a plurality of FPAs and the scanning steps of Blocks 800-804 are performed for each of the FPAs. In one example, each of the filters on the first FPA transmit a different portion of long wavelengths in a range of 3-14 micrometers, and each of the filters on the second FPA transmit a different portion of short wavelengths in a range of 0.4 to 2 micrometers.

Block 806 represents using the sums to map the weather condition (e.g., using the sums for weather nowcasting or forecasting).

Table 3 provides the spectral bands and the weather features they can be used to measure. As indicated in Table 3, the signal from the VSWIR band FPA can be used to measure the surface of the Earth, clouds, aerosols, wind, ice, water quality, vegetation, snow cloud distinction, and the signal from the MWIR band FPA can be used to measure wind, humidity, cloud phase, and ozone.

In one or more examples, the mapper achieves between 0.5 and 2.0 km GSD (e.g., 0.5 km GSD for the PAN band, 1.0 km GSD for the VNIR/SWIR bands and 2.0 km for the MWIR/LWIR bands) thereby meeting or exceeding requirements in all bands.

The present disclosure further reports on the surprising and unexpected discovery that embodiments of the mapper/imager, e.g., as illustrated in FIG. 1A, 1B, and FIG. 5A, including coolers 126*a*, 126*b*, optics (including scanning mirrors 104, 106, telescope 108, FPAs 120, 122, 124 with butcher block filters 304), radiative cooler panels 150, and electronics 128, 132, 134, 138, 140 130 for the optics and coolers, can all be accommodated in a significantly reduced volume (e.g., 1 m³ or less) and/or have a significantly reduced mass (e.g., less than 160 kg) while also maintaining comparable or better performance as compared current planned NOAA and EUMETSAT GEO Imagers. As illustrated herein, imagers according to embodiments of the invention (e.g., as illustrated in FIGS. 1A, 1B and 5A) surprisingly and unexpectedly have a signal to noise ratio (SNR) of 500 or greater and/or a noise equivalent temperature differential (NEdT) of less than 0.1 K while at the same time having a reduced mass (e.g., less than 160 kg) and volume (e.g., 1 m³ or less).

TABLE 2 meteorological sensor spectral and spatial requirements

| Band | sub-group | Wavelength (microns) Upper-lower | Heritage | Priority | GSD (km) Goal Max | Main Applications |
|---|---|---|---|---|---|---|
| 1 | VNIR | 0.45-0.49 | ABI, FDHSI | 1 | 0.5 1.5 | Surface, clouds, aerosols |
| 2 | VNIR | 0.59-0.69 | ABI, FDHSI | 1 | 0.5 1.5 | Wind, clouds, ice mapping |
| 3 | VNIR | 0.704-0.714 | MERIS-09 | 2 | 0.5 1.5 | Water quality, chlorophyll |
| 4 | VNIR | 0.85-0.89 | ABI, FDHSI | 1 | 0.5 1.5 | Win, aerosols, vegetation, |
| 5 | SWIR | 1.04-1.06 | SGLI SW1 | 2 | 1.0 3.0 | Snow grains and clouds |
| 6 | SWIR | 1.37-1.39 | ABI, FDHSI | 2 | 1.0 3.0 | Cirrus detection |
| 7 | SWIR | 1.58-1.64 | ABI, FDHSI | 1 | 0.5 1.5 | Snow-cloud distinction, ice cover |
| 8 | SWIR | 2.22-2.28 | ABI, FDHSI | 1 | 2.0 3.0 | Aerosol, smoke, cloud phase |
| 9 | MWIR | 3.8-4.0 | ABI, FDHSI | 1 | 2.0 3.0 | Fog, fire detection, ice/cloud separation, wind, phase |
| 10 | MWIR | 5.77-6.60 | ABI, FDHSI | 1 | 2.0 3.0 | Wind, high level humidity |
| 11 | MWIR | 6.75-7.15 | ABI, MTSAT | 2 | 2.0 3.0 | Wind, mid level humidity |
| 12 | MWIR | 7.24-7.44 | ABI, FDHSI | 1 | 2.0 3.0 | Wind, low level humidity |
| 13 | LWIR | 8.30-8.70 | ABI, FDHSI | 1 | 2.0 3.0 | Total water, cloud phase |
| 14 | LWIR | 9.42-9.80 | ABI, FDHSI | 2 | 2.0 3.0 | Total ozone |
| 15 | LWIR | 10.1-10.6 | ABI, FDHSI | 2 | 2.0 3.0 | Cloud, surface, cirrus |
| 16 | LWIR | 10.8-11.6 | ABI, HIRS | 1 | 2.0 3.0 | Cloud, sst, ash |
| 17 | LWIR | 11.8-12.8 | | 1 | 2.0 3.0 | Ash, sst |
| 18 | LIRCO2 | 13.0-13.6 | ABI, FDHSI | 1 | 2.0 3.0 | Cloud height |
| 19 | LIRCO2 | 13.5-13.8 | MODIS, HIRS | 2 | 2.0 6.0 | Cloud height, low level temperature |
| 20 | LIRCO2 | 13.8-14.1 | MODIS, HIRS | 2 | 2.0 6.0 | Cloud height, mid level temperature |
| 21 | LIRCO2 | 14.1-14.4 | MODIS, HIRS | 2 | 2.0 6.0 | Cloud height, high level temperature. |

Figure 10:
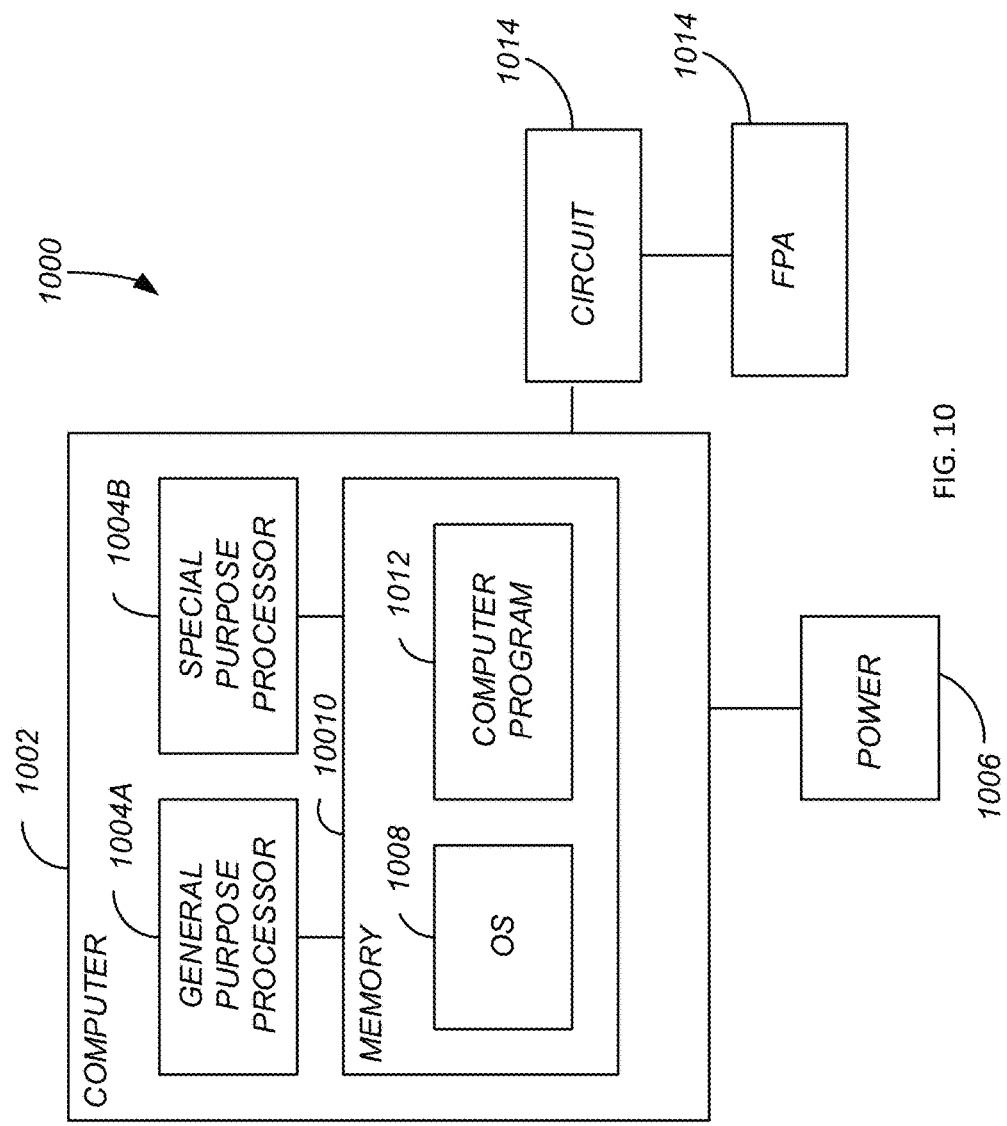
FIG. 10 illustrates an example hardware environment used to perform one or more of the methods described herein.
Figure 11A:
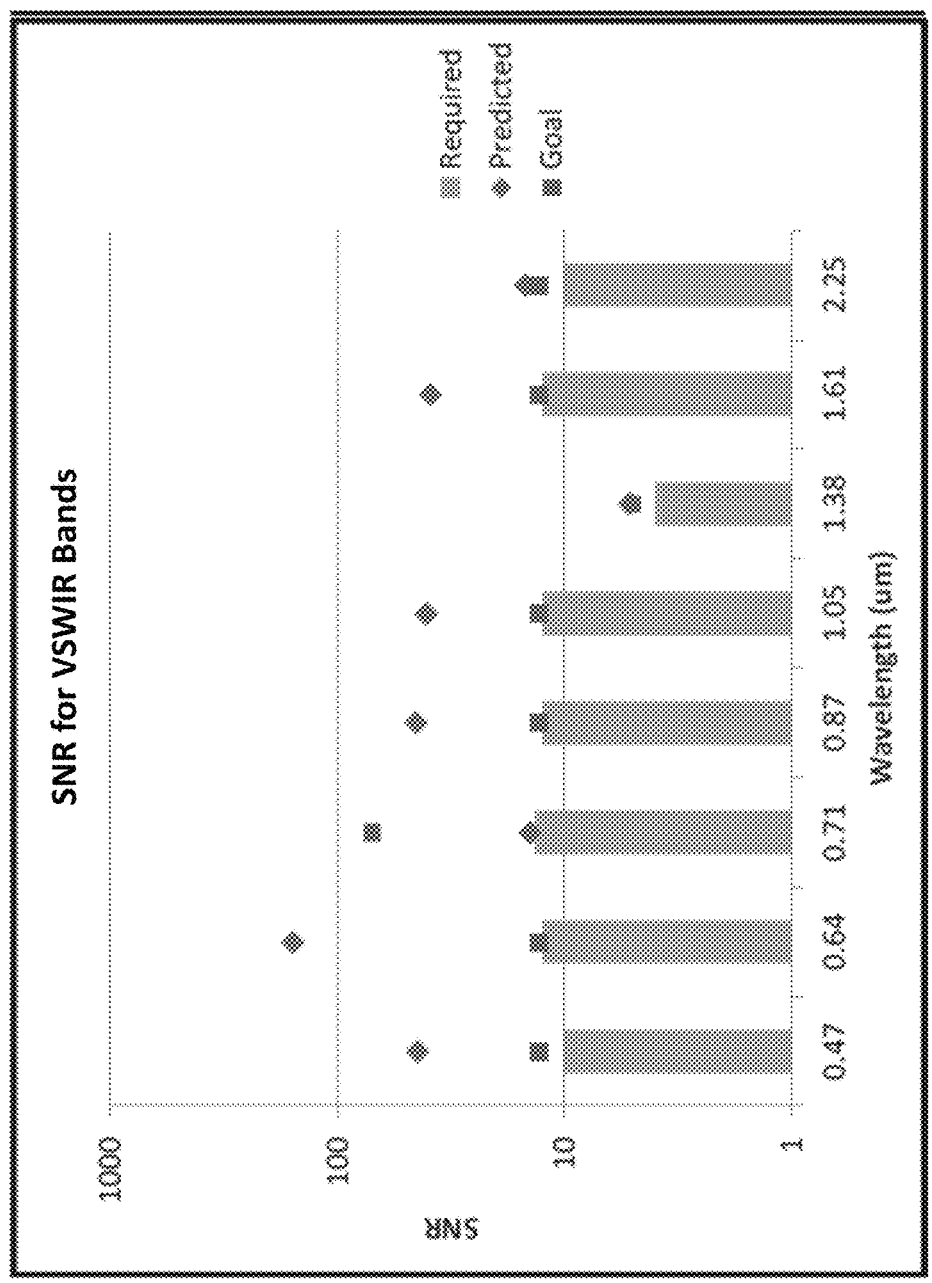
FIG. 11A illustrates SNR for GEMM Visible-to-Shortwave Infrared (VSWIR) bands.
Figure 11B:
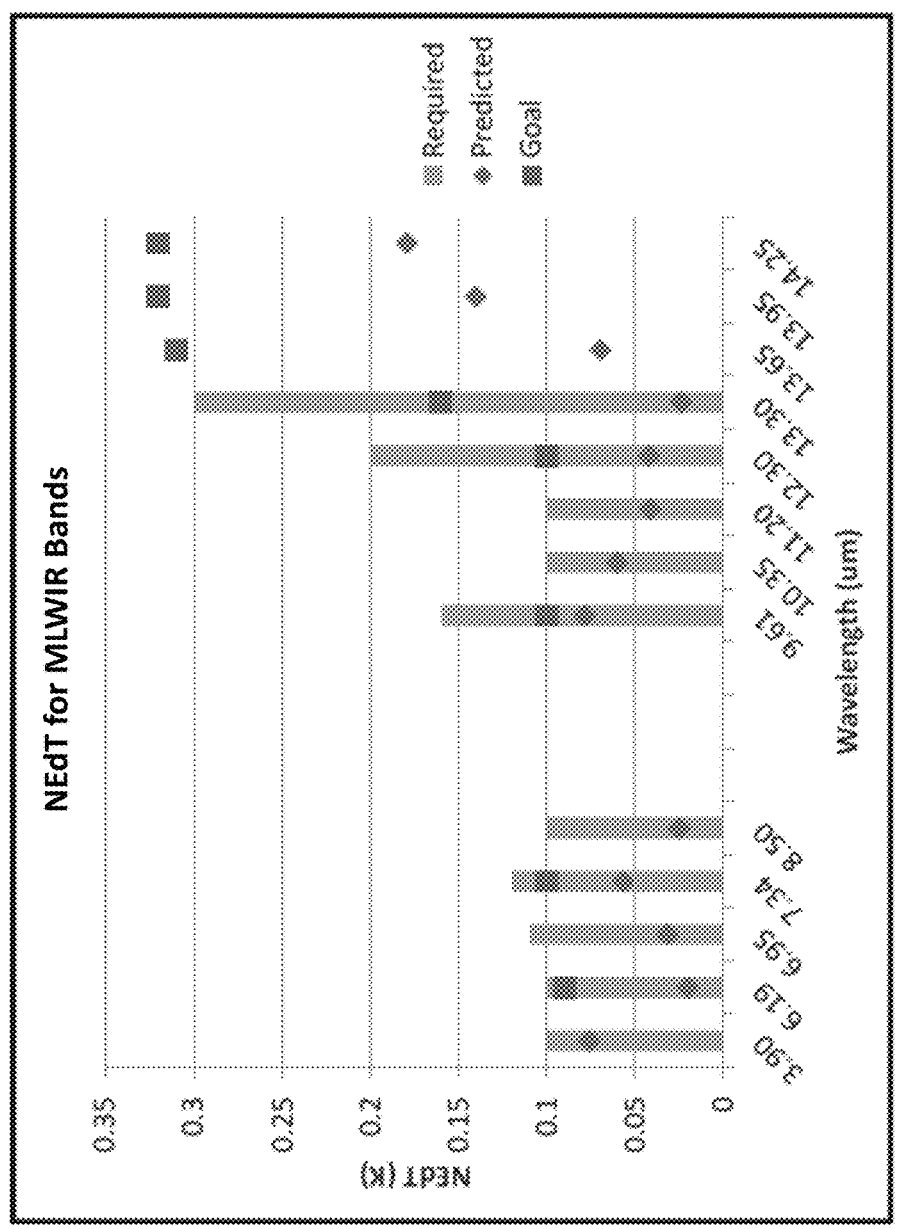
FIG. 11B illustrates NEdT for GEMM thermal bands (showing GEMM meets requirements for all bands, according to one or more embodiments.

FIG. 10 illustrates an exemplary system 1000 used to implement processing elements needed to control the imager and process the weather mapping data.

The computer 1002 comprises a processor 1004 (general purpose processor 1004A and special purpose processor 1004B) and a memory, such as random access memory (RAM) 1006. Generally, the computer 1002 operates under control of an operating system 1008 stored in the memory 1006, and interfaces with the user/other computers to accept inputs and commands (e.g., analog or digital signals) and to present results through an input/output (I/O) module. The computer program application 1012 accesses and manipulates data stored in the memory 1006 of the computer 1002. The operating system 1008 and the computer program 1012 are comprised of instructions which, when read and executed by the computer 1002, cause the computer 1002 to perform the operations herein described. In one embodiment, instructions implementing the operating system 1008 and the computer program 1012 are tangibly embodied in the memory 1006, thereby making one or more computer program products or articles of manufacture capable of controlling various aspects of the imager and/or processing the data outputted from imager into useful information (e.g., a weather map).

As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Orbit, Imaging and Scanning Parameters

Table 3 provides the nominal orbit, imaging and scanning parameters assumed in the GEMM design. Table 4 gives the coverage times for GEM in three scanning modes.

GEMM is designed to operate in a Geosynchronous Earth Orbit (approximately 35860 km). The optics focal length is sized to achieve 1 km in the VSWIR bands (Bands 1-8) for the 30 μm detector used in the system. Two mirrors in the object space (in front of the telescope) provide along-track and cross-track full disk scanning including the surrounding space. A 2×2 array of detectors of the same size are used to make the 2 km bands in the MLWIR (Bands 9-21). On-board calibration is provided vicariously through observation of known ground targets for the solar reflective bands, while a chopper is used to maintain stability in the infrared bands. Cross-calibration with polar orbiting satellites may be used to achieve the desired on-orbit radiometric and spectral accuracies. Additional on-board calibration is possible if required.

TABLE 3

Features of the GEMM instrument

| Parameter | GEMM Design |
| --- | --- |
| Orbit | H = 35860 km |
| | Geostationary Earth Orbit |
| Imaging | 0.5 km × 0.5 km PAN |
| | 1 km × 1 km VSWIR |
| | 2 km × 2 km MLWIR |
| Scanning | 2-Single Axis Scan Mirrors |
| | θx = ±12°, θy = ±10° |
| | 1280 km Swath (N/S) |
| | Full Disk in 15 minutes |
| On board Cal | MLWIR Shutter Calibrator |
| Telescope | D = 180 mm, f/6 |
| | Three Mirror Anastigmat |
| Spectral Separation | Discrete Bandpass Filters at the FPA |
| | VSWIR: 8, MLWIR: 13 |

TABLE 3-continued

Features of the GEMM instrument

| Parameter | GEMM Design |
| --- | --- |
| Detectors | PAN: 32 × 5200; d = 13 !m |
| | VSWIR: 480 × 1280; d = 30!m |
| | MLWIR: 480 × 1280; 2 × 2 avg |
| Cooling | Toptics = 160 K |
| | Tfpa = 65 K, 160 K. 360 mW |

TABLE 4

GEMM acquisition times for mesoscale, regional, and global coverage

| GEMM Scan rates | N/S km | E/W km | Swaths N/S | Time E/W s | Retrace s | Total time s | Total time Min |
| --- | --- | --- | --- | --- | --- | --- | --- |
| Mesoscale | 1280 | 1280 | 1 | 7.4 | 0.0 | 7.4 | 0.1 |
| Regional | 3000 | 5000 | 3 | 17.4 | 30.0 | 82.3 | 1.4 |
| Global | FD | FD | 10 | 71.3 | 135.0 | 848.3 | 14.1 |

TABLE 5

MTF calculation for the GEMM Instrument.

| MTF Prediction | | Along Track | | Cross-Track | |
| --- | --- | --- | --- | --- | --- |
| Parameter | Units | VSWIR | MLWIR | VSWIR | MLWIR |
| λ | μm | 0.65 | 12.50 | 0.65 | 12.50 |
| GSD | km | 1.000 | 2.000 | 1.000 | 2.000 |
| fny | cy/km | 0.500 | 0.167 | 0.500 | 0.167 |
| Pixel | MTF | 0.637 | 0.827 | 0.637 | 0.827 |
| Optics | MTF | 0.900 | 0.900 | 0.900 | 0.900 |
| Diffraction | MTF | 0.983 | 0.486 | 0.983 | 0.486 |
| Integration | MTF | 1.000 | 1.000 | 0.637 | 0.827 |
| Total | MTF | 0.563 | 0.362 | 0.358 | 0.299 |
| Required | MTF | 0.32 | 0.22 | 0.32 | 0.22 |

GEMM Expected Performance

First order spatial and radiometric performance were calculated for the GEMM design. The results show excellent performance for most bands, with a falloff at the longest wavelength bands due to detector material sensitivity.

Spatial Performance

The Modulation Transfer Function (MTF) was calculated for the GEMM optical system. The optical performance is near diffraction limited, with a considerably lower MTF in the MLWIR than the VSWIR. A system level MTF was calculated and the results are shown in Table 5. MTF meets requirements at the Nyquist frequency of 0.5 cy/km (1 km GSD) for the VSWIR, and 0.167 cy/km (3 km GSD) for the MLWIR bands. The lower spatial resolution in the MLWIR is needed to accommodate the additional diffraction at the longer wavelengths.

Radiometric Sensitivity

The SNR and NEdT for the GEMM were computed using "Dim" signal levels for the target radiance, with saturation radiances corresponding to the "Maximum" signal levels provided in the MRD for the solar reflective bands (VSWIR), and goal maximum temperatures for the MLWIR. NEdTs were evaluated at 300 K compared to the requirements at that temperature. The results are shown in FIG. 12. Requirements and goals are satisfied for all bands.

Hosting and GEMM Accommodation Considerations

GEMM can be accommodated on commercial communications satellite with minimal impact to the commercial operator's primary goals and that GEMM requirements for pointing, stability, thermal (heat rejection), data, power, mass can be met.

The sensor interface to the host satellite bus follow the guidelines already established by the providers for hosted payloads. Power, data, and thermal interfaces can be designed to minimize the cost of integration and testing by minimizing the interaction between the sensor and the host and by using standard interfaces already in common usage.

Sounder

Figures 12A, 12B:
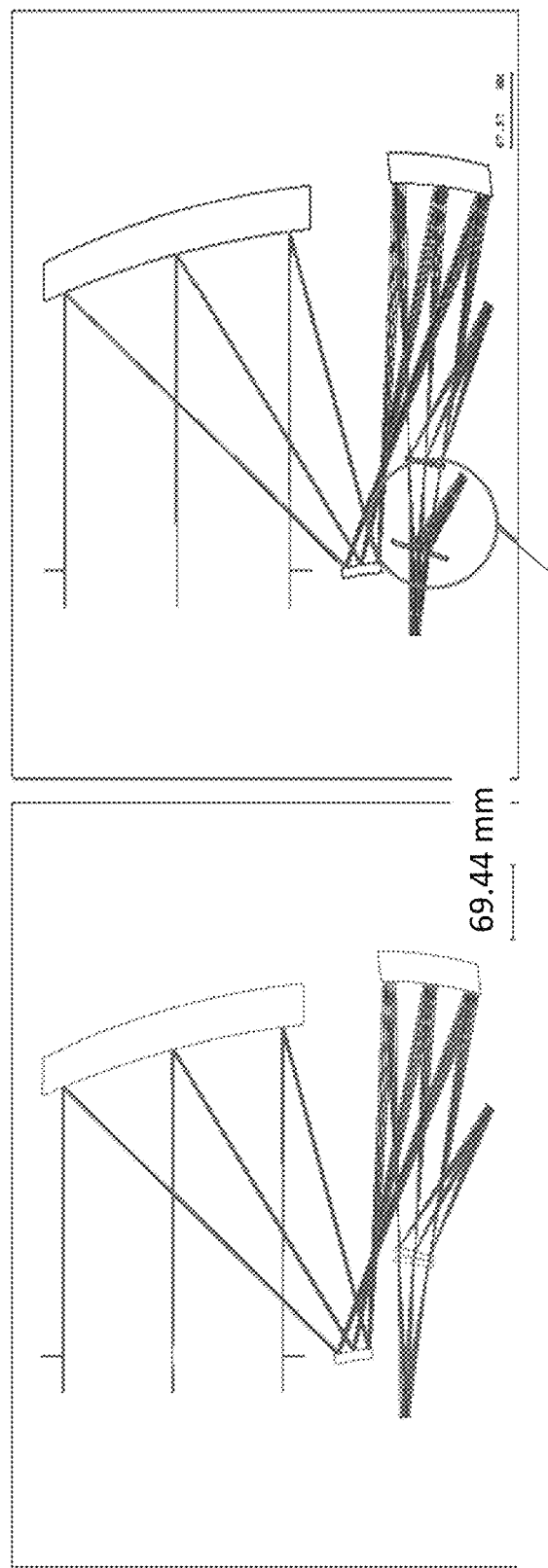
FIGS. 12A-12B illustrate a pick off for the sounder in the optical system, according to one or more embodiments.

FIG. 12A illustrates optics for the imager without a sounder and FIG. 12B illustrates the MWIR sounder pickoff 1200 for the sounder system.

Figure 13:
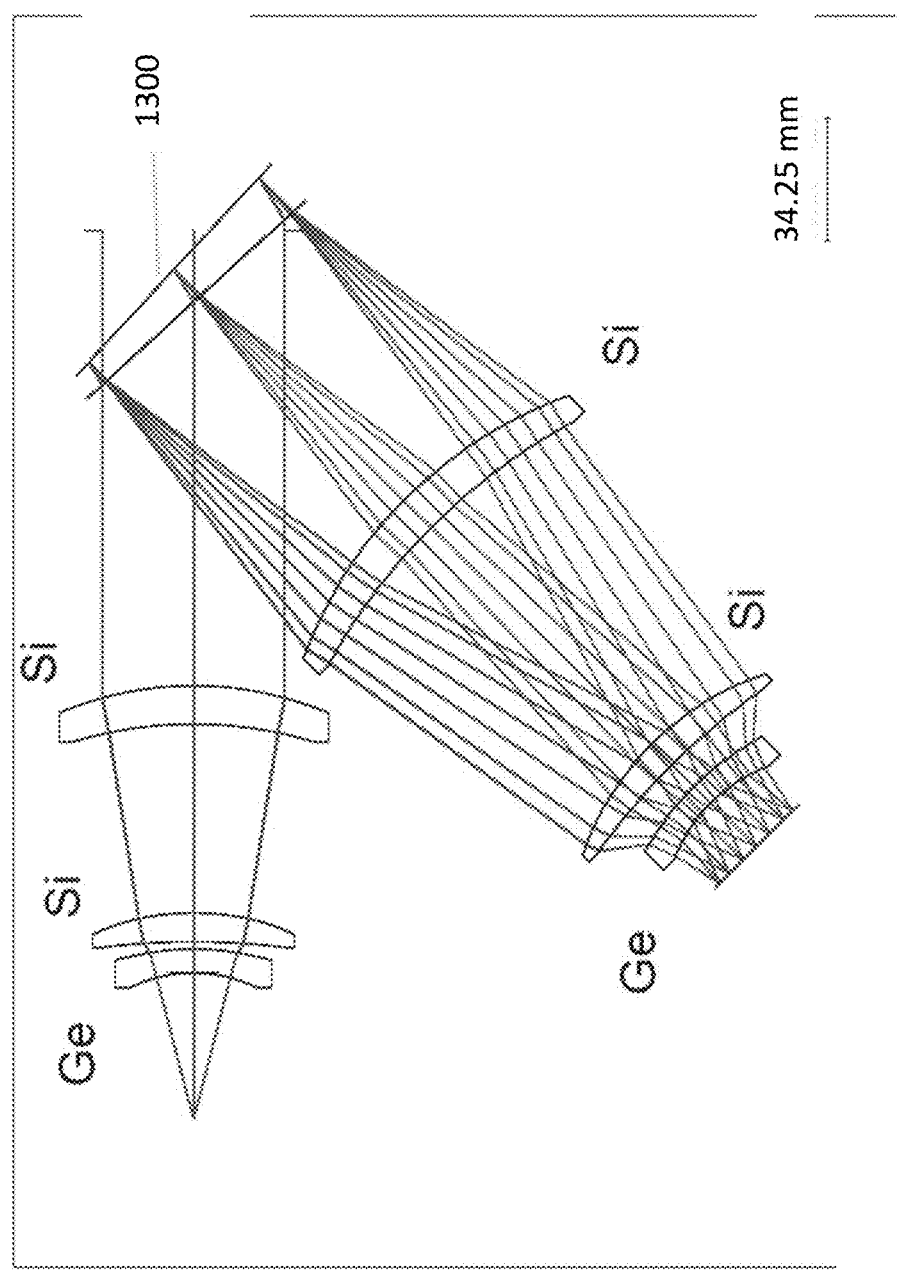
FIGS. 13 and 14 illustrate sounder systems coupled to the imager, according to one or more embodiments.
Figure 14:
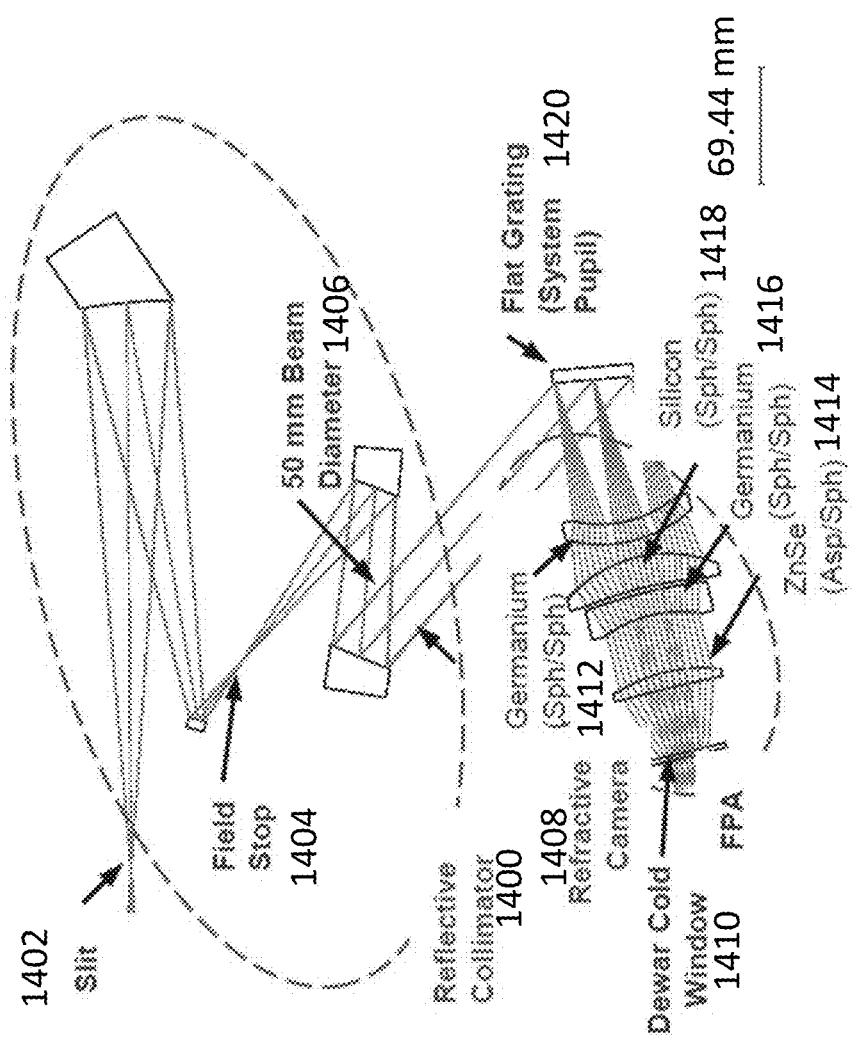

FIGS. 13 and 14 illustrate example sounder systems. FIG. 13 illustrates silicon (Si) and germanium (Ge) elements as well as Ge wedge/immersed grating. FIG. 14 illustrates reflective collimator 1400 comprising slit 1402, field stop 1404, and 50 mm beam diameter 1406, and refractive camera 1408 comprising cold dewar window 1410, germanium (Sph/Sph) 1412, FPA, ZnSe (Asp/sph) 1414, germanium (Sph/Sph) 1416, and silicon (Sph/Sph) 1418. Also shown is a flat grating system pupil 1420.

Possible Modifications and Variations

The imager 500 of the present invention is not limited to weather mapping applications. The imager 500 could also be used for stand-off chemical detection or in telescope for terrestrial based imaging applications. For example, the filter covered FPA, summing electronics, and telescope could be attached to earth based fixtures (e.g., buildings) for remote sensing applications.

Advantages and Improvements

The GEMINI uses a wide-field scanning approach that maximizes the time allowed for scanning, leading to the need for a smaller telescope aperture. The design includes large format/high frame rate sensor arrays, precision three-mirror anastigmat optics, precision optical filters, compact active cryocoolers and high accuracy scanners.

TABLE 6

Size, weight, power and data rate for ABI and GEMM

| | ABI | GEMM |
|---|---|---|
| Size | 1.59 m × 1.52 m × 1.36 m | 1.3 m × 1.1 m × 0.86 m |
| Volume | 3.28 m³ | 0.86 m³ |
| Weight | 275 kg | 153 kg |
| Power | 450 W | 256 W |
| Rate | 66 Mbps | 56 Mbps |

The performance of the JPL GEMM is comparable to the Thales Flexible Combined Imager (FCI) on the EUMETSAT (European Organisation for the Exploitation of Meteorological Satellites) Meteosat Third Generation (MTG) of satellites, and the Exelis ABI, however the size of GEMM is significantly smaller and provides a very cost-effective hostable solution. Table 6 shows a comparison of the key performance indicators from the GEMM, ABI, and FCI instruments.

TABLE 7

Comparison of performance of GEMM, ABI, and Thales FCI

| Metric | GEMM | EXELIS ABI | THALUS FCI |
|---|---|---|---|
| Spectral Bands | 16-21 | 16 | 16 |
| GSD (VNIR/SWIR) | 0.5-1.0 km | 0.5-1.0 km | 0.5-1.0 km |
| GS (MWIR/LWIR) | 2.0 km | 2.0 km | 2.0 km |
| SNR (@ 100% Albedo | >500 | 300 | 300 |

TABLE 7-continued

Comparison of performance of GEMM, ABI, and Thales FCI

| Metric | GEMM | EXELIS ABI | THALUS FCI |
|---|---|---|---|
| Nedt (@300K) | <0.1K | 0.1-0.3K | 0.1-0.3K |
| Full Disk revisit time | 15 min | 15 min | 15 min |

The horizontal resolution of the atmospheric temperature and water vapor profile accuracy of the GOES-R imager is expected to be 10 km with a vertical resolution of less than 3-5 km [2].

The design also allows for enhanced capability (as an option) using advanced hyperspectral MWIR sounding technology to improve sensitivity to temperature and humidity near the surface and provide 3D weather forecasting data products. The addition of an optional Midwave Infrared (MWIR) spectrometer into the GEMM optical train enables atmospheric sounding with 4 km horizontal resolution and 1 km vertical temperature and 2 km vertical water vapor profile resolution. The improvement will lead to better accuracy in surface air temperature and humidity and improved characterization of aerosol and cloud properties. Water vapor winds are currently an operational product from the MODIS instruments on Aqua and Terra and can be achieved with vertical resolution (i.e. 3D Winds) using this option.

REFERENCES

The following references are incorporated by reference herein.

[1]. Observing Systems Capability Analysis and Review Tool (OSCAR), www.wmosat.info/oscar/instruments/view/3

[2]. Li, J., T. Schmit, X. Jin, G. Martin, .GOES-R Advanced Baseline Imager (ABI) Algorithm Theoretical Basis Document for Legacy Atmospheric Moisture Profile, Legacy Atmospheric Temperature Profile, Total Precipitable Water, and Derived Atmospheric Stability Indices. http://www.goesr.gov/products/ATBDs/baseline/Sounding_LAP_v2.0_no_color.pdf

[3]. Pagano, T. S., Aumann, H., Gerber, A., Kuai, L., Gontijo, I., DeLeon, B., Susskind, J., Iredell, L., Bajpai, S., "Requirements for a Moderate-resolution Infrared Imaging Sounder (MIRIS)", Proc. SPIE 8870-7, San Diego, Calif. (2013).

[4]. Canadian Space Agency, Polar Communication and Weather (PCW) Mission Requirements Document, CSA-PCWRD-003, Revision C, Jun. 11, 2013, NCAGE Code: L0889

[5]. R. Demers et al., The CHROMA focal plane array: a large-format, low-noise detector optimized for imaging spectroscopy, Proc SPIE, Vol 8870, (2013) DOI: 10.1117/12.2029617

[6]. Cardinali, C, "Monitoring the observation impact on the short-range forecast", Q. J. R. Meteorol. Soc. 135, 239.250 (2009)

[7]. Website accessible at "http://www.vision-systems.com/articles/print/volume-20/issue-7/departments/technology-trends/filters-and-optics-multi spectral-filters-let-camera-vendors-target-niche-markets.html"

[8]. Website accessible at http://www.teledyne-si.com/pdf-imaging/CHROMA %20Brochure%20-%20rev%201%20v5%20-%20SR.pdf

[9]. Website accessible at http://www.northropgrumman.com/Capabilities/HighEfficiencyCryocoolers/Documents/page Docs/HighEfficiencyCryocooler PerformanceICC18.pdf

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of mapping a weather condition, comprising:
(a) collecting electromagnetic radiation on an imager from different spatial positions in a field of view, wherein:
the electromagnetic radiation comprises different bands of wavelengths,
the imager includes an array of filters on at least one focal plane array (FPA) including pixels,
each of the filters are associated with a different set of the pixels;
the pixels are arranged in columns and rows,
each of filters overlay the set of the pixels in each of the columns,
each of the filters cover a different plurality of the rows, and
(b) scanning the electromagnetic radiation across each of the filters along each of the columns in turn, wherein the scanning comprises:
(1) each of the filters transmitting a portion of the electromagnetic radiation, comprising a different one of the bands of wavelengths, to the set of the pixels associated with the filter and each column of pixels receiving the portion of the electromagnetic radiation transmitted from a different one of the spatial positions in the field of view, and
(2) for each of the sets:
(i) irradiating each of a plurality of different pixels in the set with the portion of the electromagnetic radiation comprising the band of wavelengths transmitted by the filter associated with the set;
(ii) reading out a signal outputted from each of the plurality of different pixels in the set, in response to the irradiating; and
(iii) summing the signals from each of the plurality of different pixels in the set, forming a sum used for mapping the weather condition;
(c) performing the steps (b)(2)(i)-(iii) for each of the sets in each column, forming the sums used for detecting the weather condition at each of the spatial positions in the field of view;
(d) push broom scanning the field of view to a plurality of positions over a region of a planet's atmosphere; and
(e) repeating steps (a)-(c) for each of the positions of the field of view.

2. The method of claim 1, further comprising collecting the electromagnetic radiation on a satellite comprising the imager and a computer summing the signals.

3. The method of claim 2, wherein the planet is Earth.

4. The method of claim 3, further comprising collecting the electromagnetic radiation on a plurality of the FPAs, the FPAs including:
a first FPA, wherein each of the filters on the first FPA transmit a different portion of long wavelengths in a range of 3-14 micrometers, and
a second FPA, wherein each of the filters on the second FPA transmit a different portion of short wavelengths in a range of 0.4 to 2 micrometers.

5. The method of claim 3, further comprising push broom scanning with the at least one FPA in a whisk orientation, such that the region having an area of 13000 km by 13000 km or less is scanned in 15 minutes or less.

6. The method of claim 5, wherein the at least one FPA includes at least 1600 of the columns and at least 480 of the rows, and the filters include at least 10 filters on each FPA.

7. The method of claim 6, further comprising measuring the electromagnetic radiation using a sounder coupled to the imager on the satellite.

8. The method of claim 6, wherein the satellite is in a geostationary orbit and the field of view is scanned in an East-West direction and a North-South direction.

9. The method of claim 6, wherein each filter comprises a stripe having a width overlaying the set of at least 10 pixels.

10. The method of claim 9, wherein each pixel has a width of at least 30 micrometers or in a range of 5-1000 micrometers.

11. The method of claim 1, wherein the pixels have a response to the electromagnetic radiation comprising wavelengths in a range of 0.4 micrometers 14 micrometers.

12. A multi-spectral imager, comprising:
an array of filters on at least one focal plane array (FPA), wherein:
the FPA includes pixels arranged in columns and rows,
each of the filters are associated with a different set of the pixels,
each of filters overlay the set of the pixels in each of the columns,
each of the filters cover a different plurality of the rows, and
each of the filters transmit a portion of electromagnetic radiation, comprising a different band of wavelengths, to the set of the pixels associated with the filter, the electromagnetic radiation collected from different spatial positions in a field of view when the electromagnetic radiation is scanned across each of the filters along each of the columns in turn, and each column of pixels receiving the portion of the electromagnetic radiation transmitted from a different one of the spatial positions in the field of view;
a circuit connected to the pixels, wherein:
(a) for each of the sets,
the circuit reads out a signal outputted from each of a plurality of different pixels in the set, in response to irradiating each of the plurality of different pixels in the set with the band of wavelengths transmitted by the filter associated with the set; and
the circuit outputs the signals to an adder, wherein the signals from each of the plurality of different pixels in the set are summed to form a sum used for detecting a weather condition,
(b) the adder sums the signals for each of the sets in each column, forming the sums used for detecting the weather condition at each of the spatial positions in the field of view, and (c) steps (a)-(b) are repeated for each of the positions of the field of view, and (d) the field of view is push broom scanned to a plurality of positions over a region of a planet's atmosphere.

13. The imager of claim 12, wherein the planet is Earth, the imager further comprising:

mirrors raster scanning the field of view inputted onto the imager over the region of the Earth's atmosphere, wherein the adder forms the sums used for detecting the weather condition at each of the spatial positions in each of the fields of view.

14. The imager of claim 13, wherein the imager is on a satellite in a geostationary orbit and the fields of view are scanned in an East-West direction and a North-South direction.

15. The imager of claim 13, further comprising a computer connected to the mirrors, wherein the computer controls the mirrors so that the raster scanning comprises push broom scanning with the FPAs in a whisk orientation, and such that the region having an area of 13000 km by 13000 km or less is scanned in 15 minutes or less.

16. The imager of claim 15, further comprising a plurality of the FPAs, the FPAs including:

a first FPA, wherein each of the filters on the first FPA transmit a different portion of long wavelengths in a range of 3-14 micrometers, and a second FPA, wherein each of the filters on the second FPA transmit a different portion of short wavelengths in a range of 0.4 to 2 micrometers.

17. The imager of claim 16, wherein each of the FPAs includes at least 1600 of the columns and at least 480 of the rows, and the filters include at least 10 filters on each of the FPAs.

18. The imager of claim 17, wherein:

each filter comprises a stripe having a width overlaying the set of at least 10 pixels, and each pixel has a width of at least 30 micrometers or in a range of 5-1000 micrometers.

19. The imager of claim 18, further comprising a sounder coupled to the imager on a satellite.

20. The imager of claim 12, wherein the pixels have a response to the electromagnetic radiation comprising wavelengths in a range of 0.4 micrometers-14 micrometers.

* * * * *

UNITED STATES PATENT AND TRADEMARK OFFICE
CERTIFICATE OF CORRECTION

PATENT NO. : 10,732,042 B2  
APPLICATION NO. : 15/783633  
DATED : August 4, 2020  
INVENTOR(S) : Thomas S. Pagano et al.

Page 1 of 1

It is certified that error appears in the above-identified patent and that said Letters Patent is hereby corrected as shown below:

On the Title Page

The list of inventors reading:
"Thomas S. Pagano, Thousand Oaks, CA (US); Joseph Sauvageau, Pasadena, CA (US); Kim A. Aaron, Pasadena, CA (US); Curt A. Henry, Pasadena, CA (US); Dean L. Johnson, Pasadena, CA (US); James P. McGuire, Pasadena, CA (US); Fabien Nicaise, Pasadena, CA (US); Nasrat A. Raouf, Pasadena, CA (US); Suresh Seshadri, Cerritos, CA (US); James K. Wolfenbarger, Pasadena, CA (US)"

Should read:
-Thomas S. Pagano, Thousand Oaks, CA (US); Joseph Sauvageau, Pasadena, CA (US); Kim A. Aaron, Pasadena, CA (US); Dean L. Johnson, Pasadena, CA (US); James P. McGuire, Pasadena, CA (US); Fabien Nicaise, Pasadena, CA (US); Nasrat A. Raouf, Pasadena, CA (US); Suresh Seshadri, Cerritos, CA (US); James K. Wolfenbarger, Pasadena, CA (US)-

Signed and Sealed this  
Third Day of November, 2020

Andrei Iancu  
*Director of the United States Patent and Trademark Office*